United States Patent
Przybyla et al.

(10) Patent No.: US 7,218,438 B2
(45) Date of Patent: May 15, 2007

(54) OPTICAL ELECTRONIC DEVICE WITH PARTIAL REFLECTOR LAYER

(75) Inventors: James R. Przybyla, Philomath, OR (US); Arthur R. Piehl, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/238,704

(22) Filed: Sep. 29, 2005

(65) Prior Publication Data

US 2006/0018348 A1 Jan. 26, 2006

Related U.S. Application Data

(63) Continuation-in-part of application No. 10/428,261, filed on Apr. 30, 2003, now Pat. No. 7,072,093.

(60) Provisional application No. 60/619,380, filed on Oct. 14, 2004.

(51) Int. Cl.
*G02B 26/00* (2006.01)
(52) U.S. Cl. ........................ 359/290; 359/259
(58) Field of Classification Search ............... 359/260, 359/290, 247, 302, 337.22, 346, 370, 398, 359/498, 577, 259; 372/20, 25, 26, 32; 385/14, 385/16, 24
See application file for complete search history.

(56) References Cited

U.S. PATENT DOCUMENTS

| | | | |
|---|---|---|---|
| 5,072,120 A | 12/1991 | Siewick | |
| 5,986,796 A | 11/1999 | Miles | |
| 6,031,653 A | 2/2000 | Wang | |
| 6,055,090 A | 4/2000 | Miles | |
| 6,201,630 B1 | 3/2001 | Balasubramanian | |
| 6,271,052 B1 | 8/2001 | Miller et al. | |
| 6,384,953 B1 | 5/2002 | Russell et al. | |
| 6,434,291 B1 | 8/2002 | Kessler et al. | |
| 6,483,635 B1 | 11/2002 | Wach | |
| 6,525,880 B2 | 2/2003 | Flanders et al. | |
| 6,531,332 B1 | 3/2003 | Shkel et al. | |
| 6,574,033 B1 | 6/2003 | Chui et al. | |
| 6,650,455 B2 | 11/2003 | Miles | |
| 6,674,562 B1 | 1/2004 | Miles | |
| 6,680,792 B2 | 1/2004 | Miles | |
| 7,064,045 B2 * | 6/2006 | Yang | 438/443 |

* cited by examiner

*Primary Examiner*—Ricky Mack
*Assistant Examiner*—Tuyen Tra

(57) ABSTRACT

An optical electronic device with a partial reflector layer is disclosed. The device includes a first reflector and a second reflector that define an optical cavity therebetween. The second reflector includes at least one material having a refractive index and an extinction coefficient, each ranging between about 1 and about 5 across the visible spectrum. A mechanism is included which is configured to permit variation of the optical cavity.

39 Claims, 12 Drawing Sheets

OPTICAL ELECTRONIC DEVICE WITH PARTIAL REFLECTOR LAYER

CROSS-REFERENCE TO RELATED APPLICATIONS

This application claims the benefit of provisional application Ser. No. 60/619,380, filed Oct. 14, 2004, and also is a continuation-in-part of U.S. patent application Ser. No. 10/428,261, filed Apr. 30, 2003 now U.S. Pat. No. 7,072,093.

BACKGROUND

The present disclosure relates generally to electronic devices, and more particularly to electronic devices having a partial reflector layer. Display devices, such as direct view displays, near eye displays, and/or projection displays, include a variety of elements/devices therein. Spatial light modulators are a non-limitative example of one such element/device in display devices. Liquid crystal displays (LCDs) and micromirror devices are also commonly used in such applications. Microelectromechanical Fabry-Perot filters have also been proposed for use in display applications. Such devices may include different dyes above the pixels to provide colors. This type of device may require various pixels to display any given color. Other devices may use color wheels to change the colors of the pixels. These devices may, in some instances, substantially eliminate the original light and may increase data and mechanical processing complexities.

SUMMARY

Disclosed herein is an optical electronic device with a partial reflector layer. The device includes a first reflector and a second reflector defining an optical cavity therebetween. The second reflector includes at least one material having a refractive index and an extinction coefficient, each ranging between about 1 and about 5 across the visible spectrum. The device also includes a mechanism permitting variation of the optical properties of the optical cavities.

BRIEF DESCRIPTION OF THE DRAWINGS

Objects, features and advantages of embodiments of the present disclosure will become apparent by reference to the following detailed description and drawings, in which like reference numerals correspond to similar, though not necessarily identical components. For the sake of brevity, reference numerals having a previously described function may not necessarily be described in connection with subsequent drawings in which they appear.

DETAILED DESCRIPTION

The ability to govern and/or control light absorbance and reflection may provide advantages in display device performance. Further, the ability to provide color selection and light attenuation (dark state selection) within a single pixel of a device may also be advantageous in certain situations. Disclosed herein is an electronic device (e.g. a spatial light modulator or an integrated circuit) that includes a partial reflector/reflector layer overlying at least a portion of the electronic device. It is to be understood that the electronic device may have optical and/or reflective characteristics, with the partial reflector layer overlying at least a portion of the elements of the electronic device.

The partial reflector layer may include at least one layer composed of material having a refractive index and an extinction coefficient ranging between about 1 and about 5 across the visible spectrum. Suitable partial reflector layer materials include, but are not limited to tantalum aluminum, titanium nitride, and tungsten silicon nitride. It is believed, without being bound to any theory, that a partial reflector layer composed of various layers, including the second reflector layer discussed hereinbelow, may advantageously provide color selection and light attenuation (dark state selection) within the electronic device.

The electronic device may be one of various optical electronic devices including, but not limited to, devices having an optical cavity capable of selecting light of a wavelength and intensity that corresponds to a pixel of a displayable image. Examples of such devices include, but are not limited to, spatial light modulators that, at least partially, display the pixel of a desired image. The spatial light modulator may be part of various configurations including, but not limited to, Fabry-Perot filters, integrated circuits, and/or display devices that operate in either an analog or a digital manner. As an analog device, a visible wavelength of light may be selected at an intensity corresponding to the color and intensity of the color of the pixel. It is also contemplated that the device may be used to display the pixel in an analog manner in black-and-white or gray scale, in lieu of color.

Figure 1A:
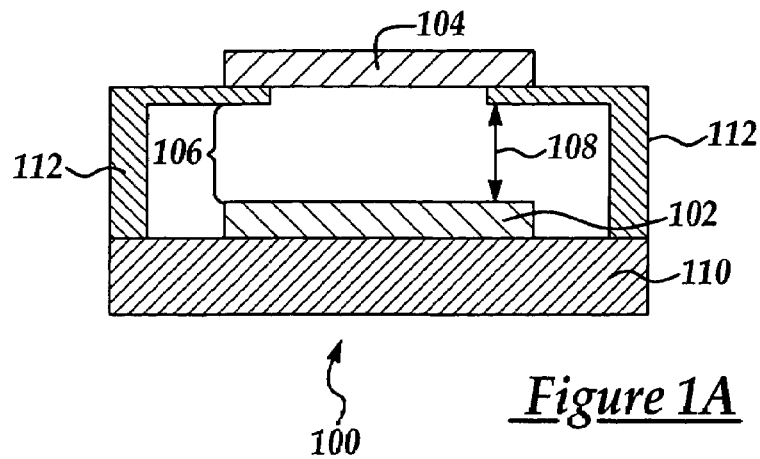
FIG. 1A is a cross-sectional view of an embodiment of an electronic device for at least partially displaying a pixel of a displayable image.

FIG. 1A shows an embodiment of a spatial light modulator 100 for at least partially displaying a pixel of a displayable image. The spatial light modulator 100 includes a first or bottom reflector 102 and a second or top reflector 104, as well as a substrate 110 and a spring mechanism 112 (i.e. flexure). A resonant optical cavity 106 as defined by the reflectors 102, 104, has a variable thickness, or width, 108. In an embodiment, the first reflector 102 is highly reflective, such as completely reflective. In a further embodiment, the second reflector 104 is semi-reflective and/or semi-transparent. In an embodiment as disclosed herein, the spring mechanism 112 may be a flexible material, such as polymers having linear or nonlinear spring functionality, metals, metal alloys, metal mixtures, and/or combinations thereof.

The optical cavity 106 may be variably selective of a visible wavelength at an intensity, by optical interference. Depending on the desired configuration of the spatial light modulator 100, the optical cavity 106 may either reflect or transmit the wavelength at the intensity. That is, the cavity 106 may be reflective or transmissive in nature. No light is generated by the optical cavity 106, such that the spatial light modulator 100 relies on ambient light or light provided by the spatial light modulator 100 that is reflected or transmitted by the cavity 106. The visible wavelength and/or intensity selected by the optical cavity 106 may be dependent on the thickness 108 of the cavity 106. That is, the optical cavity 106 may be tuned to a desired and/or required wavelength at a desired and/or required intensity by controlling its thickness 108.

In an embodiment where the cavity 106 is transmissive in nature, the film thicknesses of the bottom reflector 102 may be adjusted so the reflector 102 is at least partially transparent. Adjustments to the thickness of the top reflector 104 may also be made to optimize performance.

The spring mechanism 112 allows the thickness 108 of the cavity 106 to vary by allowing either the first reflector 102 or the second reflector 104 to move. More generally, the substrate 110 and the spring mechanism 112 constitute a mechanism that allows variation of the optical properties of the optical cavity 106 to variably select a visible wavelength at an intensity. The optical properties include the optical index of the cavity 106, and/or the optical thickness of the cavity 106. A voltage applied between the reflectors 102, 104, or an electrical charge stored on the reflectors 102, 104, causes the thickness 108 of the cavity 106 to change. This may be due in part to the spring mechanism 112 allowing one of the reflectors 102, 104 to move. Thus, the spring mechanism 112 has a spring restoring force, such that the voltage applied to the reflectors 102,104 or the charge stored on the reflectors 102, 104 causes the spring mechanism 112 to yield and allow one of the reflectors 102, 104 to move, thus achieving the desired thickness 108. It is to be understood that no power is dissipated in maintaining a given thickness 108.

In one embodiment, the first reflector/reflector layer 102 is maintained at a fixed voltage, and the second reflector/reflector layer 104 is set to a voltage depending on the desired visible wavelength and the desired intensity, as calibrated to the stiffness of the spring mechanism 112. In the embodiment shown in FIG. 1A, the spring mechanism 112 is attached to the second reflector 104. In another embodiment, the spring mechanism 112 may be attached to the first reflector 102, such that the first reflector 102 is movable, instead of the second reflector 104, to adjust the thickness 108 of the optical cavity 106. Furthermore, in another embodiment, there may be more than one optical cavity 106, such that the optical cavity 106 is inclusive of more than one such cavity. In one embodiment, the first reflector 102 and the second reflector 104 may be considered the plates of a capacitor, where the optical cavity 106 represents the dielectric therebetween. A potential applied between the first reflector 102 and the second reflector 104 moves the first reflector 102, due to the spring mechanism 112, but also causes a charge to be stored in the capacitor. It is this electrostatic charge that then allows maintenance of the given thickness 108 without any further voltage application over the reflectors 102, 104.

As a digital device, the electronic device (e.g. spatial light modulator 100) may be responsible for either the red, green, or blue color component of the pixel. The device 100 may maintain a static visible wavelength (e.g. red, green, or blue), and may vary the intensity of this wavelength corresponding to the red, green, or blue color component of the pixel. Therefore, a device 100 may be required for each color component (e.g. red, green, blue) of the pixel, or portion, of the image. More specifically, three of the devices 100 display the pixel digitally, where one device 100 selects a red wavelength, another device 100 selects a green wavelength, and a third device 100 selects a blue wavelength. More generally, there is a device 100 for each color component of the pixel, or portion, of the image. Furthermore, in an alternate embodiment, the electronic device (e.g. spatial light modulator 100) may be used to display the pixel in a digital manner in black-and-white, or in gray scale, in lieu of color.

The optical cavity 106 of the device 100 may utilize optical interference to transmissively or reflectively select a wavelength at an intensity. In an embodiment, the optical cavity 106 may be a thin film having a light path length equal to the thickness 108 of the cavity 106. Light may be reflected from the boundaries of the reflectors 102, 104 on either side of the cavity, 106, thus possibly interfering with itself. The phase difference between the incoming beam and its reflected image is k(2d), where d is the thickness 108, because the reflected beam travels the distance 2d within the cavity 106. Since $$\kappa = \frac{2\pi}{\lambda},$$

then when $$d = \frac{\lambda}{2},$$

the phase difference between the incoming and the reflected waves is k2d=2π, giving constructive interference. All multiples of $$\frac{\pi}{2},$$

which are the modes of the optical cavity 106, are transmitted. As a result of optical interference, then, the optical cavity 106 passes the most light at integer multiples of $$\frac{\lambda}{2},$$

and the least amount of light at odd integer multiples of $$\frac{\lambda}{4}.$$

Although the above calculations capture the primary mechanism for interference-based light modulation, more rigorous electromagnetic simulations may be considered to more accurately describe actual device performance.

In one embodiment, the second reflector 104 includes a thin, partially transmitting metallic film, such as titanium nitride, for which n−ik=1.85−i2.3, where n represents the refractive index (real optical index) of the cavity 106, and k represents the extinction coefficient (imaginary optical index) of the cavity 106. The second/top reflector 104 includes at least one material having a refractive index (real optical index) and an extraction coefficient (imaginary optical index) ranging between about 1 and about 5 across the visible spectrum. Suitable materials include, but need not be limited to, titanium, tantalum aluminum, titanium nitride, tungsten silicon nitride, alloys thereof, and/or mixtures thereof. In this embodiment, absorption and/or interference may play roles in modulating the color and intensity of the output of the device 100.

The bottom reflector 102 may be a high-reflectance metallic substrate. It is desirable that the material of choice be atomically smooth and have a reflectivity of at least about 90%. Such materials include aluminum, aluminum copper alloys, silver, gold, platinum, silicon, tantalum, nickel, alloys thereof, compounds thereof, and/or mixtures thereof.

In one embodiment, where the device 100 is digital, the optical cavity 106 acts as an adjustable spacer, and it may select a red wavelength of 6500 angstroms, a green wavelength of 5500 angstroms, or a blue wavelength of 4500 angstroms, at an intensity depending on, at least in part, the corresponding color component of the pixel to be displayed. Furthermore, the optical cavity 106 may achieve low reflection or transmission. In this latter state, the optical cavity 106 is a so-called "dark mirror" that may be optimized for less than five percent reflection or transmission.

For example, in an embodiment, the film stack sequence of the bottom (first) reflector 102, the optical cavity 106, and the top (second) reflector 104 can achieve a red wavelength of 6100 angstroms, in accordance with the following table:

| Layers | Real index (n) | Imaginary Index (k) | Thickness (angstroms) |
|---|---|---|---|
| Bottom Reflector 102 (silver) | 0.3 | 2.3 | 6250 |
| Optical cavity 106 | 1 | 0 | 3000 |
| Top Reflector 104 (titanium) | 1.85 | 2.3 | 200 |

Similarly, this film stack sequence may achieve a green wavelength of 5500 angstroms in accordance with the following table:

| Layers | Real index (n) | Imaginary index (k) | Thickness (angstroms) |
|---|---|---|---|
| Bottom Reflector 102 (silver) | 0.3 | 2.3 | 6250 |
| Optical cavity 106 | 1 | 0 | 2500 |
| Top Reflector 104 (titanium) | 1.85 | 2.3 | 200 |

The film stack sequence may also achieve a blue wavelength of 4500 angstroms in accordance with the following table:

| Layers | Real index (n) | Imaginary index (k) | Thickness (angstroms) |
|---|---|---|---|
| Bottom Reflector 102 (silver) | 0.3 | 2.3 | 6250 |
| Optical cavity 106 | 1 | 0 | 2000 |
| Top Reflector 104 (titanium) | 1.85 | 2.3 | 200 |

Thus, the film stack sequence achieves a red wavelength of 6500 angstroms, a green wavelength of 5500angstroms, or a blue wavelength of 4500 angstroms, depending on whether the thickness of the optical cavity 106 is 3000 angstroms, 2500 angstroms, or 2000 angstroms, respectively.

Finally, the film stack sequence can achieve a low reflection or a low transmission in accordance with the following table:

| Layers | Real index (n) | Imaginary index (k) | Thickness (angstroms) |
|---|---|---|---|
| Bottom Reflector 102 (silver) | 0.3 | 2.3 | 6250 |
| Optical cavity 106 | 1 | 0 | 1000 |
| Top Reflector 104 (titanium) | 1.85 | 2.3 | 200 |

This results in dark gray, nearly black output, where the thickness of the optical cavity 106 is 1000 angstroms. By ratioing the amount of time that a pixel remains in the colored or black states, a large range of average hues, color saturations, and intensities may be obtained.

As has been indicated, the spring mechanism 112 allows the thickness 108 of the optical cavity 106 to vary when an appropriate voltage has been applied across the reflectors 102,104, such that a desired wavelength at a desired intensity is selected. This voltage may be determined in accordance with the following equation, which is the force of attraction between the reflectors 102, 104 acting as plates of a parallel plate capacitor, and which does not take into account fringing fields:

$$F = \frac{\varepsilon_o V^2 A}{2d^2} \quad (1)$$

where $\varepsilon_o$ is the permittivity of free space, V is the voltage across the reflectors 102, 104, A is the area of each of the reflectors 102, 104, and d is the thickness 108. Thus, a one-volt potential applied across a 100 micron square pixel, with a thickness 108 of about 0.25 micron, yields an electrostatic force of $7 \times 10^{-7}$ Newton (N).

Therefore, a small voltage between the reflectors 102, 104 may provide sufficient force to move the top reflector 104 or bottom reflector 102, and hold it against gravity and shocks. Once the voltage has been applied, the electrostatic charge stored in the capacitor created by the reflectors 102, 104, and defining the cavity 106, is sufficient to hold the reflectors 102, 104 in place without additional power. Charge leakage may require occasional refreshing of the charge, however.

The force defined in equation (1) is balanced with the linear spring force provided by the spring mechanism 112:

$$F = k(d_o - d), \quad (2)$$

where k is the linear spring constant, and do is the initial value of the thickness 108. The range in which the forces of equations (1) and (2) are in stable equilibrium occurs when the value $(d_o - d)$ is between zero and $$\frac{d_o}{3}.$$

At $$(d_o - d) > \frac{d_o}{3},$$

the electrostatic force of attraction of equation (1) overcomes the spring force of equation (2), such that the second reflector 104 snaps to the first reflector 102, which is undesirable. It is to be understood that the first reflector 102 may also undesirably snap to the second reflector 104. This occurs because when the reflector 104 is beyond the $$\frac{d_o}{3}$$

position, excess charge is drawn onto the reflectors 102, 104 due, in part, to increased capacitance, which in turn increases the attractive force of equation (1) between the reflectors 102, 104, causing the reflector 104 to pull towards the reflector 102. To overcome this limitation, the force between the reflectors 102, 104 of equation (1) can instead be written as a function of charge:

$$F = \frac{-Q^2}{2\varepsilon A} \quad (3)$$

where Q is the charge on the capacitor. Thus, the force F is now not a function of the distance d, and stability of the reflector 104 can exist over the entire range of 0 to $d_o$. By limiting the amount of charge on the reflectors 102, 104, the position of the second reflector 104 may be set over the entire range of travel. Although the description of the preceding paragraphs concerns an ideal parallel-plate capacitor and an ideal linear spring restoring force, it is to be understood that the principle described may be adapted to other configurations, such as nonlinear springs and other types of capacitors. Substantially eliminating or reducing the range of operation where snap down of the reflector 104 against the reflector 102 occurs enables more practical analog operation, or non-contact discrete operation, without limiting the number of colors as may otherwise transpire when snap down occurs. That is, because the usable range may be substantially increased, more colors, saturation levels, and/or intensities may be achieved.

In addition, in one embodiment, constructing the spring mechanism 112 in a particular manner may increase the range in which non-contact operation may occur without snap down. The particular manner may be such that the restoring force of the spring mechanism 112 is a non-linear function of the displacement of the substrate 110, and the restoring force increases at a faster rate than the displacement. This manner may be achieved by increasing the thickness of the spring mechanism 112, or by using a spring mechanism 112 that is first bent and then stretched, which is known as a "bend and stretch" design.

Furthermore, the device 100 may be operated at smaller values of the thickness 108, allowing a black state to be achieved without any portion of the reflectors 102, 104 coming into contact with one another. This substantially prevents stiction and the accompanying hysteresis that may occur when the reflectors 102, 104 contact one another. However, even if the reflectors 102, 104 are allowed to contact one another, the voltage difference between the reflectors 102, 104 will generally be less where the amount of charge on the reflectors 102, 104 is specifically controlled (that is, where a predetermined amount of fixed charge is controlled), as opposed to where the voltage between the reflectors 102, 104 is specifically controlled. This may advantageously reduce electrostatic breakdown in the dielectric separating the reflectors 102, 104 that defines the optical cavity 106, as well as reducing the electrostatic force between the reflectors 102, 104 that would otherwise increase stiction, and the wear on any anti-stiction standoffs employed to reduce the surface area between the reflectors 102, 104.

Figure 1B:
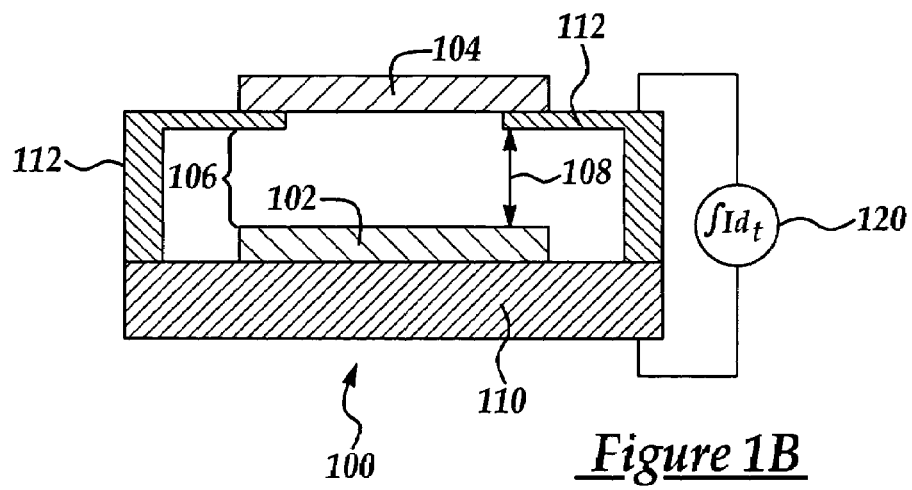
FIGS. 1B, 1C and 1D are cross-sectional views of the electronic device shown in FIG. 1A showing different approaches to control the charge stored on the electronic device.
Figure 1C:
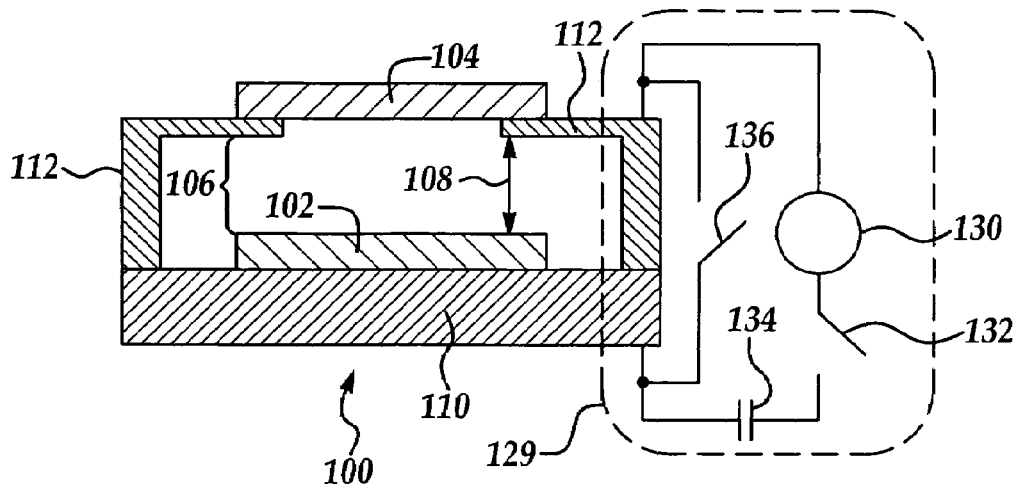
Figure 1D:
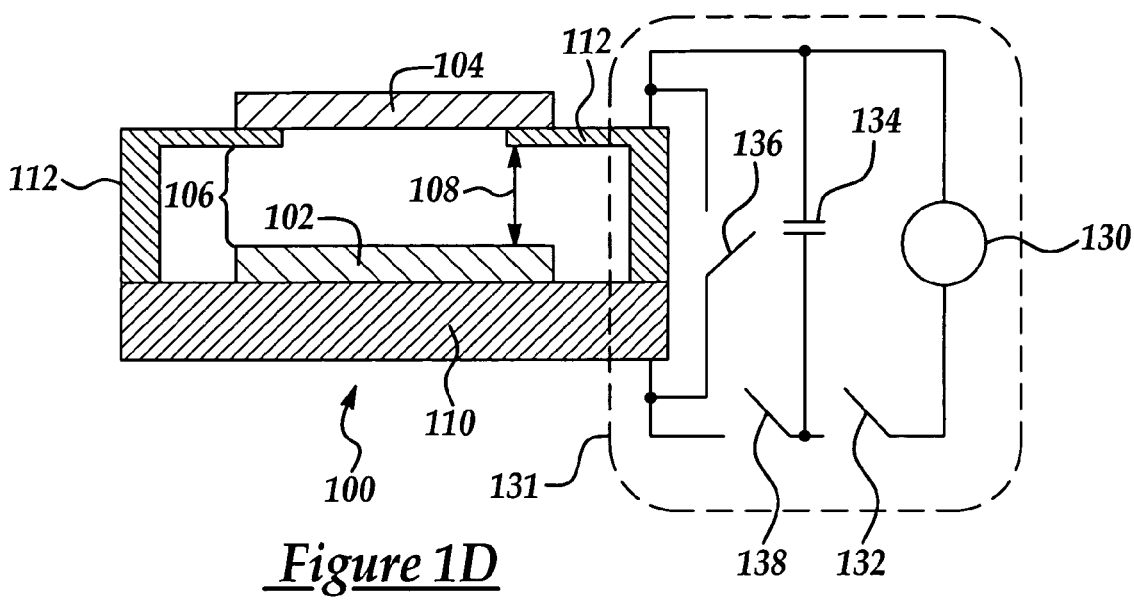

FIGS. 1B, 1C, and 1D show different approaches to control the amount of charge on the reflectors 102, 104 of the spatial light modulator 100, as opposed to specifically controlling the voltage between the reflectors 102, 104 according to varying embodiments. As described hereinabove, the thickness 108 between the reflectors 102, 104 may be regulated by controlling the charge stored on the reflectors 102, 104. In this embodiment, the reflectors 102, 104 act as-the plates of a parallel plate capacitor.

In FIG. 1B, a controlled, or predetermined, amount of charge is injected onto the reflectors 102, 104 by integrating a known current for a known time, utilizing the current integration mechanism 120 electrically coupled to the reflectors 102, 104. The current (I) and/or the time (t) may be manipulated to yield the desired amount of charge. The mechanism 120 may include a current source, a digital-to-analog current source, and/or time division circuitry to create the desired level of charge. It is to be understood that the amount of charge introduced may be sufficient to vary one or more of the optical properties of the optical cavity 106 such that visible wavelength and/or intensity are variably selectable to correspond with a pixel of a displayable image.

In FIG. 1C, the charge available to the reflectors 102, 104 is limited to substantially prevent snap down of the reflectors 102, 104 together. In an embodiment, this may be accomplished by utilizing a voltage divider circuit 129. The divider circuit 129 may include a voltage source 130 placed in series with a capacitor 134. A switch 132 controls the on-off operation of the circuit 129. A second switch 136, placed in parallel with the voltage source 130 and the capacitor 134, acts as a reset switch, which may be utilized to avoid voltage and/or charge drift over time, due, in part, to charge leakage. The reset is desirably performed more quickly than the mechanical response time of the circuit 129.

Where the substrate 110 is linear, the range of stable travel may be extended through the entire thickness 108 of the optical cavity 106 if $$C < \frac{C'_{int}}{2},$$

where C is the capacitance of the capacitor 134, and $C'_{int}$ is the initial capacitance of the variable capacitor formed by the reflectors 102, 104, and the optical cavity 106. As the voltage of the voltage source 130 increases, the resulting charge is shared between the variable capacitor and the capacitor 134 to at least substantially eliminate snap down of the reflectors 102, 104. This principle may be applied to configurations other than a parallel plate capacitor and a linear spring restoring force, such as nonlinear springs and capacitors other than parallel plate capacitors.

In FIG. 1D, the charge on the reflectors 102, 104 is controlled using an approach referred to as "fill-and-spill," which utilizes a fill-and-spill circuit 131. First, the second switch 136 may be closed and opened to discharge the variable capacitor formed by the reflectors 102, 104, and the optical cavity 106. A third switch 138 of the circuit 131 may then be opened while the switch 132 is closed in order to charge the fixed capacitor 134. The capacitor 134 is "filled." Next, when the switch 132 is opened and the third switch 138 is closed, the capacitor 134 shares its charge with the variable capacitor. That is, the capacitor 134 "spills" its charge. The charge on the reflectors 102, 104 may reach a stable value, even though it depends on the thickness 108 of the optical cavity 106. The voltage source 130 has thus provided a controlled charge to maintain the desired thickness 108 of the cavity 106.

In an embodiment, the optical interference to transmissively or reflectively select wavelengths at desired intensities relies, in part, upon first-order gaps. That is, the gap of the optical cavity 106, which is the thickness 108 of the optical cavity 106, may be regulated so as to control the interference first-order wavelengths of light. However, as the thickness 108 of the optical cavity 106 increases, reflectance peaks shift to longer wavelengths, and additional higher order peaks may move into the spectral region.

The spectral bandwidth of the electronic device (e.g. spatial light modulator 100) may be determined by the optical constants of the layers utilized for the reflectors 102, 104, their thicknesses, and the thickness 108 of the optical cavity 106. In such instances, the electronic device may function as a Fabry-Perot based light modulator. The spectral purity, or saturation, of the reflected light is determined by the spectral bandwidth of the device, and tradeoffs may have to be made between peak reflectance, spectral bandwidth, black state reflectance, and optical efficiency of the white state. Peak reflectance occurs for reflective Fabry-Perot modulators when:

$$2nd = m\lambda, \tag{4}$$

where, as before, n is the gap (refractive) index, d is the thickness 108 of the optical cavity 106, m is a non-negative integer specifying the interference order, and λ is the wavelength of light. Equation (4) specifies a simple model of interference. It is to be understood that the actual reflectance spectra may be more accurately modeled by performing rigorous electromagnetic simulations, involving all material constants and interfaces within the device 100.

The higher-order peaks generally exhibit a narrower spectral bandwidth and thus increased saturation. The spectral bandwidth of the green state is particularly significant in determining saturation, since the wavelengths in and around the green wavelengths overlap the blue and red sensitivity curves of the human eye. The red and blue saturation may be improved by shifting the peak spectral wavelength away from the adjacent color-response curves and into the relatively insensitive portion of the spectrum, which is not possible with green. Narrowing the spectral bandwidth to increase the green saturation therefore has the problem of limiting the brightness of the display, since the peak sensitivity of the human eye is in the green region, leading to a reduced white level and lower overall contrast.

Figure 2A:
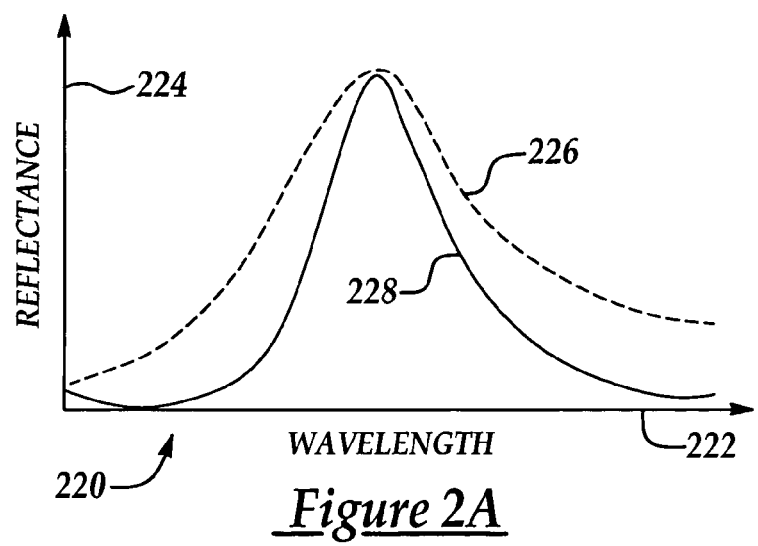
FIGS. 2A and 2B are graphs of representative spectral responses of the electronic device shown in FIG. 1A.

To overcome this limitation, the thickness 108 may be increased to produce second-order, or more generally higher-order, color, rather than first-order color. FIG. 2A shows a graph 220 of a representative first-order green spectral response 226 and a representative green second-order spectral response 228, according to an embodiment. The y-axis 224 denotes reflectance as a function of wavelength on the x-axis 222. The second-order response 228 has a narrower spectral bandwidth and improved color saturation. Thus, the second-order response 228 may be utilized in one embodiment, in lieu of the first-order response 226 for increased saturation and color component. In another embodiment, the second-order response 228 is utilized for increased saturation, whereas the first-order response 226 is utilized for increased brightness and white level.

Figure 2B:
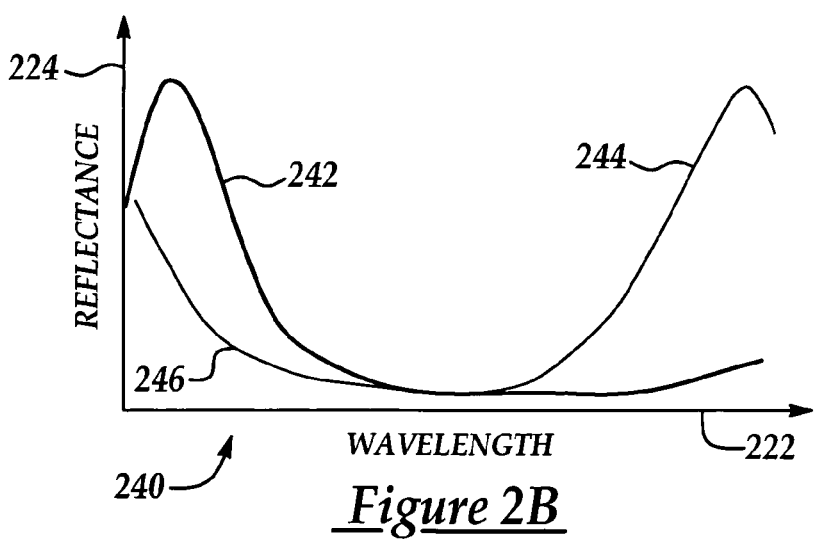

Color saturation is typically improved for second-order responses for blue through green. FIG. 2B shows a graph 240 of a second-order blue spectral response 242, according to an embodiment. The graph 240 has the y-axis 224 denoting reflectance as a function of wavelength on the x-axis 222, as before. The second-order blue response 242 provides for increased saturation, as compared to using a first-order blue spectral response. However, the second-order red spectral response 244 is less useful, because the third-order blue spectral response 246 begins to enter the visible spectral range.

Figure 3:
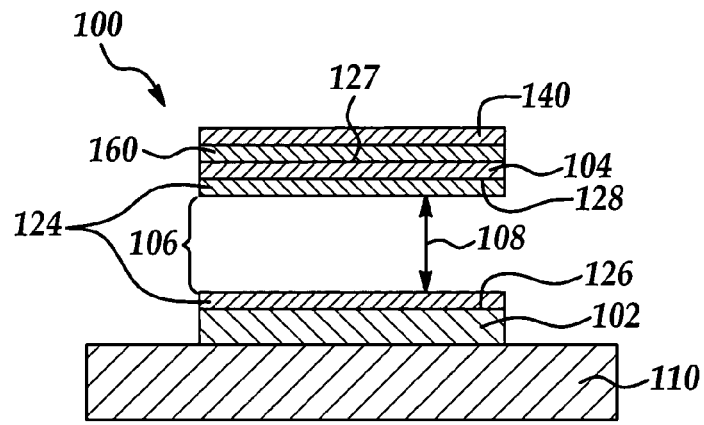
FIG. 3 is a cross-sectional view of an embodiment of a spatial light modulator on a substrate including insulators, a stiffening layer, and an anti-reflective coating layer.

Referring now to FIG. 3, an embodiment of a spatial light modulator 100 is depicted. The first/bottom reflector 102 is deposited on a suitable substrate 110 and is in a spaced relationship to the second/top reflector 104. The space between the two reflectors 102, 104 defines the optical cavity 106 that may be controlled and/or regulated as previously discussed. Flexures, spring mechanisms, and/or the like may be incorporated in the structure, but have been removed for clarity.

It is contemplated that the second/top reflector 104 may include a partial reflector capable of reflecting and/or absorbing various light components. In this embodiment, the second/top reflector 104 includes a thin, partially transmissive film having a refractive index (real optical index) (n) ranging between about 1 and about 5 and an extinction coefficient (imaginary index) (k) ranging between about 1 and about 5. Non-limiting examples of partial reflector materials include tantalum aluminum, titanium nitride alloys, tungsten silicon nitrite, alloys thereof, and/or combinations thereof.

Suitable tantalum aluminum alloys include those generally depicted by the formula $Ta_xAl_y$, in which x and y may be present at a ratio between about 1:1 and about 1:2, tantalum to aluminum, respectively. Suitable titanium nitride alloys are generally depicted by the formula $Ti_xN_y$, in which the various components are present at ratios ranging between about 3:4 and about 4:3, titanium to nitride, respectively.

Figure 4A:
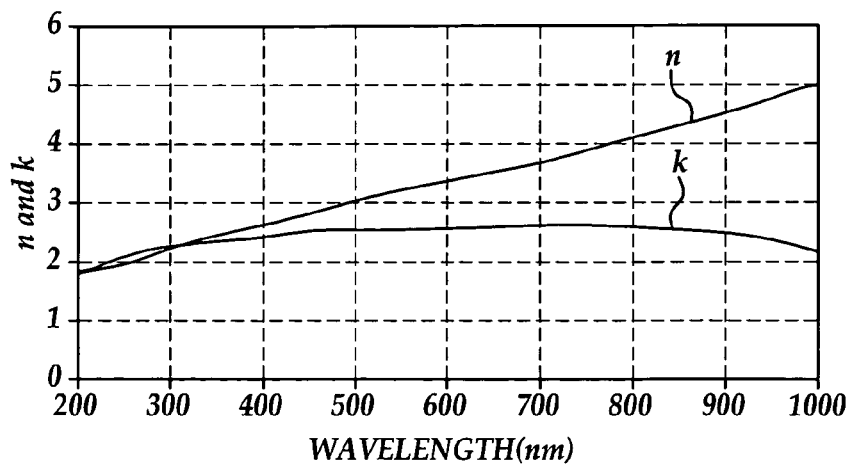
FIG. 4A is a graph showing the optical constants of tantalum aluminum.
Figure 4B:
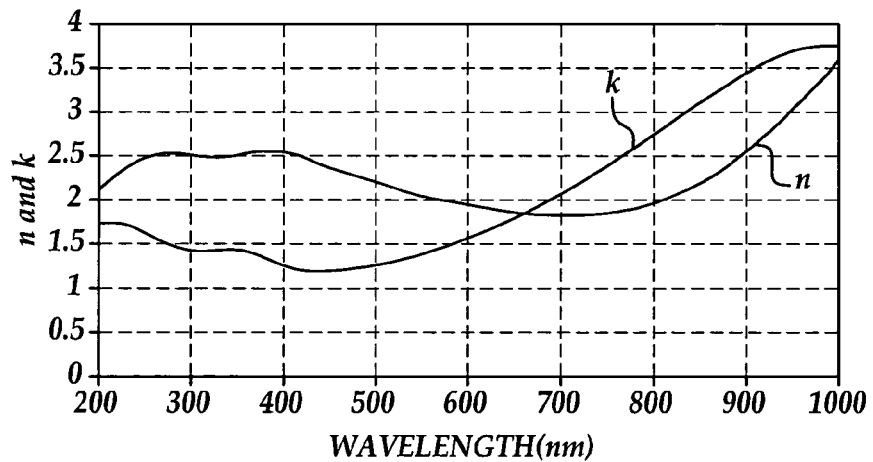
FIG. 4B is a graph showing optical constants of tungsten silicon nitride.
Figure 4C:
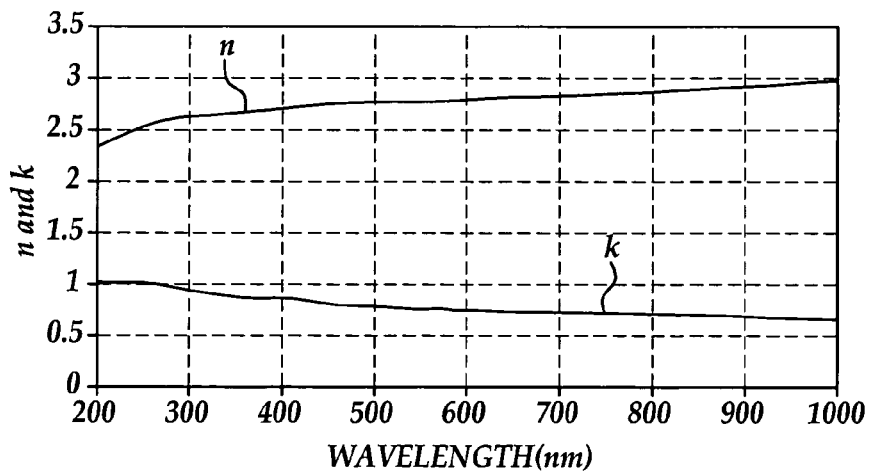
FIG. 4C is a graph showing optical constants of titanium nitride.

It is contemplated that the material of choice will have optical constants (n and k) which remain in the range (between about 1 and about 5) at wavelengths between 200 and 1000 and, more specifically, in the visible range. Generally, the material for the second reflector 104 may have characteristics that balance transparency, reflectivity, and partial absorbency. Optical constants (n and k) for tantalum aluminum thin films of approximately 100 angstroms are depicted in FIG. 4A. Optical constants (n and k) for tungsten silicon nitride and titanium nitride thin films of approximately 100 angstroms are characterized in FIGS. 4B and 4C, respectively. As shown in the graphs in FIGS. 4A, 4B, and 4C, the respective materials provide suitable performance, particularly in the visible range.

As described in detail above, application of an electrical charge to the reflectors 102, 104 may be used to control the thickness 108 of the optical cavity 106. However, as the voltage increases, electrostatic forces may increase, and the first and second reflectors 102, 104 may snap together, thereby causing an electrical shortage. To address this potential problem, reflectors 102, 104 may be provided with one or more insulator layers 124 positioned between the first and second reflectors 102, 104. It is contemplated that the first and second reflector layers 102, 104 each have first and second faces, wherein the first face 126 of the first reflector 102 faces the second face 128 of the second reflector 104. The faces 126,128 of the respective reflectors 102, 104 may have the insulator layer(s) 124 established thereon, as shown in FIG. 3. It is to be understood that the insulator layer(s) may be established on one or both of the faces 126, 128 of the reflectors 102, 104.

The insulator layer(s) 124 may be composed of a suitable material(s) having electrical insulating characteristics. The material(s) of choice may exhibit optical qualities suitable for use in the associated device. Such optical qualities include, but are not limited to, transparency to visible light or light in the wavelength desired, and limited reflectivity as measured by refractive index. Non-limitative examples of materials suitable for the insulator layer(s) 124 include silicon dioxide ($SiO_2$), silicon nitride ($SiN_2$), silicon carbide (SiC), and/or combinations thereof. Where multiple electrostatic insulator layers 124 are employed, the same or different materials may be used in connection with the respective reflector layers 102, 104.

Typically, materials employed in the insulator layer(s) 124 will have a refractive index greater than air. Where desired and/or required, it is contemplated that the thickness 108 of the optical cavity 106 between the first and second reflectors 102, 104 for a given filter characteristic may be offset by the addition of the insulator layer(s) 124.

The insulator layer(s) 124 may have a thickness sufficient to substantially prevent or minimize electrical shorts between reflectors 102, 104. Maximum thickness of insulator layer(s) 124 may generally be bound by desired filter characteristics and will typically be defined by reflectance characteristics. Thus, in a spatial light modulator 100, it is contemplated that dark state characteristics may be relevant in determining the thickness of the insulator layer(s) 124. For example, if a dark state is required, a silicon dioxide insulator layer 124 may have a thickness of less than about 700 angstroms in order to achieve the desired dark state performance. The minimum thickness for the insulator layer(s) 124 may be defined by the breakdown voltage of the material employed. The insulator layer(s) 124 may have sufficient thickness to substantially prevent or minimize breakdown at the given device voltage. For example, a high quality silicon oxide might exhibit a breakdown voltage of approximately 5 to 10 $MV/cm^2$ (0.05 to 0.10 V/angstrom). Thus, for a 15V device, an oxide layer of approximately 300 angstroms may be adequate to substantially prevent or minimize breakdown voltage.

The thickness of the respective reflector layers 102, 104 is that required to provide suitable reflectivity in the case of the first reflector 102 and/or to provide appropriate absorbance and/or transmission in the case of the second reflector 104. In an embodiment, the thickness of the first reflector 102 ranges between about 400 Angstroms and about 15,000 Angstroms. It is contemplated that the second reflector 104 may have a thickness suitable to provide desired light transmission and/or to substantially minimize light absorbance in any undesired ranges. Therefore, the thickness of the second reflector 104 may be less than about 200 angstroms. Without being bound to any theory, it is believed that a second reflector 104 thickness of less than about 100 angstroms may provide desired transmission and/or substantially minimize undesired light absorbance. In some instances it is contemplated that a thickness of less than about 50 angstroms may be employed.

In order to substantially increase the mechanical strength and/or robustness of the second reflector/reflector layer 104, the first face 127 of the second reflector 104 may have a layer of material suitable to act as a stiffening layer 160 established thereon. The stiffening layer 160 may be composed of any material having suitable strength and/or exhibiting appropriate optical transparency in the desired wavelength range. Where the configuration disclosed herein is employed in display devices and the like, it is contemplated that the desired optical transparency will be over at least a portion of the visible light range.

In an embodiment, materials having a lower refractive index and/or extinction coefficient may be advantageously employed. It is contemplated that materials having an extinction coefficient (k) of less than about 0.010 across the visible spectrum may be suitable, with materials having an extinction coefficient ranging between about 0 and about 0.005 across the visible spectrum being advantageously employed. The material of stiffening layer 160 may also have a refractive index which is similar to that of air (n=1.00) in order to substantially minimize unwanted reflection at an interface between air and the stiffening layer 160. Suitable materials may have a refractive index such that unwanted reflection is below about 10%. It is to be understood that reflection less than about 5% may also be obtained. By way of a non-limiting example, transparent films such as silicon oxide (n=1.46 at 5500 angstroms) may be employed. Other transparent films such as silicon nitride (n=2.02 at 5500 angstroms) or silicon carbide (n=2.64 at 5500 angstroms) may also be used in certain applications.

The stiffening layer 160 may also have a thickness sufficient to provide support and/or rigidity to the second reflector layer 104. It is contemplated that the thickness of stiffening layer 160 may range between about 0.5 μm and about 3.0 μm micron.

Figure 5:
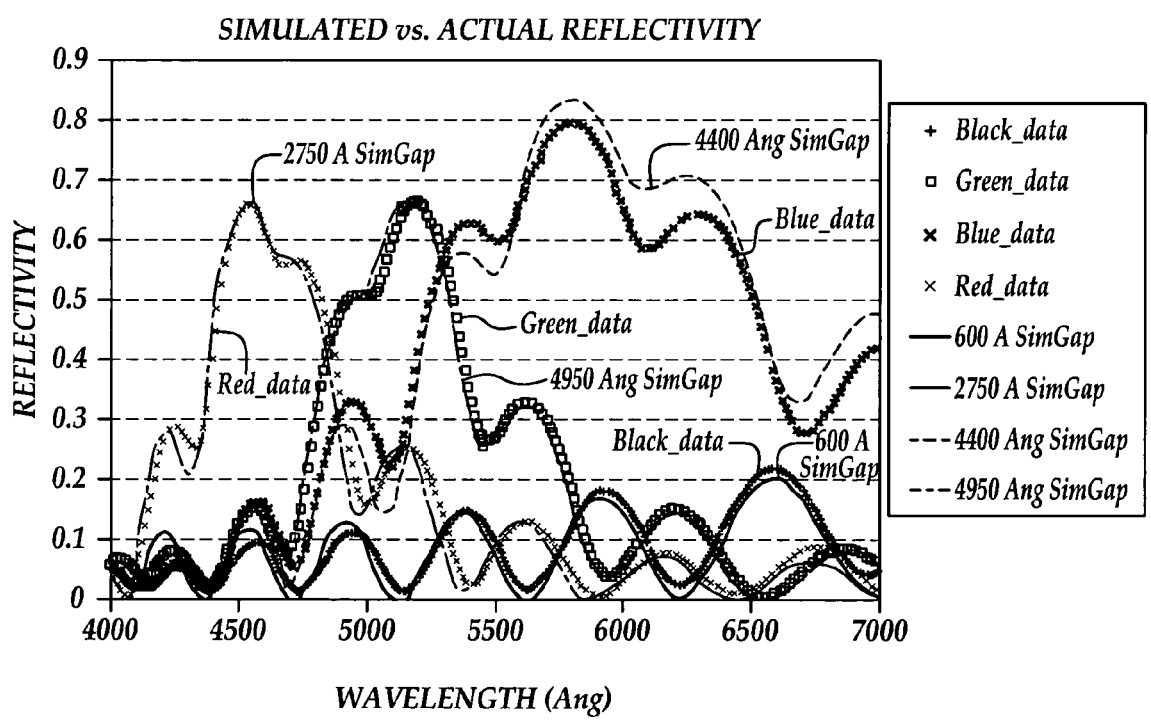
FIG. 5 is a graph of simulated versus actual reflectivity for an embodiment of an electronic device at various air gaps.

The electronic device (e.g. spatial light modulator 100) as disclosed herein may also include at least one anti-reflective coating layer 140 in overlying relationship with at least a portion of the stiffening layer 160. It is to be understood that the anti-reflective coating layer 140 may be placed in overlying relationship with stiffening layer 160 at a position opposed to the first face 127 of the second reflector layer 104. The anti-reflective coating layer 140 may be composed of any suitable material that is able to reduce unwanted reflections, due in part to the stiffening layer 160. An anti-reflective coating 140 may include a ¼ wavelength thickness of magnesium difluoride. It is to be understood that multiple stacks of anti-reflective coatings 140 may be added to the structure as desired and/or required by a particular end use. FIG. 5 depicts a graph of the measured reflectance data from silicon wafers made with a thin film stack as disclosed herein having an oxide stiffening layer 160 and a 50 angstrom tantalum aluminum second reflector layer 104. Simulated results based on measured n and k values for these films are also shown in the graph. These results indicate that the film's peak wavelength (color) may be modulated by changing the thickness 108 of the optical cavity 106. A thickness 108 of approximately 600 angstroms results in a dark state. Approximate thicknesses 108 are indicated in FIG. 5. The influence of oxide reflections, due in part to the stiffening layer 160, are seen as sinusoidal changes in reflectivity with a period of about 700 angstroms forming limitations in dark state value and available contrast. Where desired and/or required, this may be addressed by adding an anti-reflective coating layer 140 as disclosed herein.

Figure 6:
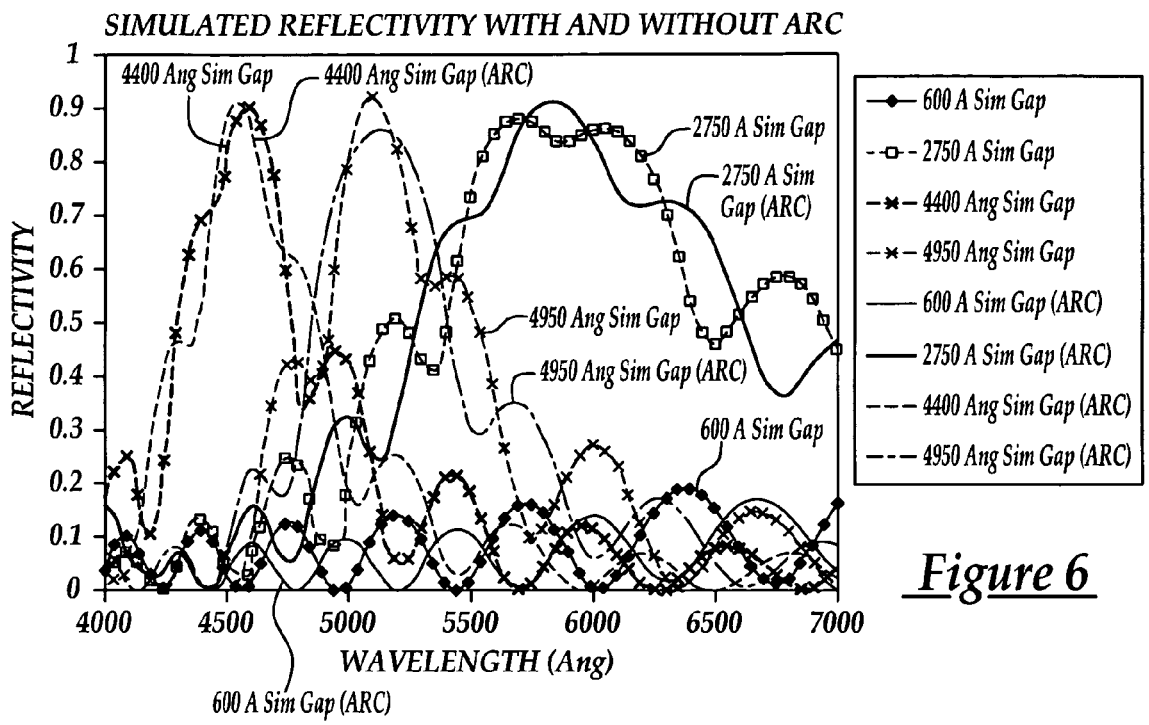
FIG. 6 is a graph of simulated reflectivity for an embodiment of an electronic device with and without an anti-reflective coating thereon at various air gaps.

FIG. 6 depicts a graph of the results of a simulation of the effects that the addition of an anti-reflective coating layer 140 of ¼ wavelength of MgF₂ has on the stack tested in FIG. 5. A reduction in black intensity is seen in the embodiments having the anti-reflective coating layer 140 thereon. It is to be understood that multiple layers of anti-reflective coating 140 may result in additional reductions in black state reflectivity.

Figure 7:
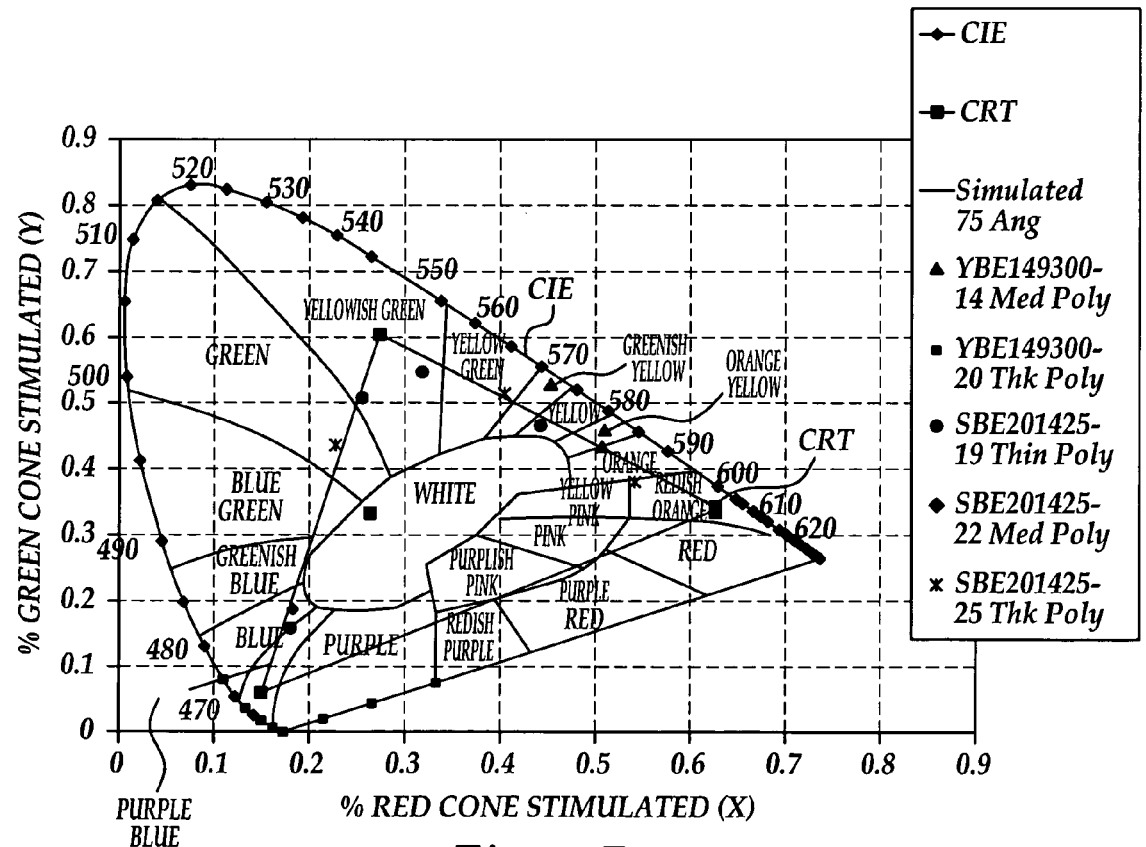
FIG. 7 is a graph of simulated versus actual color gamut results for varying air gap thicknesses of an embodiment of an electronic device.

Referring now to FIG. 7, simulated versus actual color gamut results for embodiments of the device described in reference to FIG. 5 having varying thicknesses 108 of the optical cavity 106 are shown. As the thickness 108 increases, the color coordinates change in a clockwise spiral on the graph. Simulation indicates that the color gamut is maximized at thicknesses 108 of approximately 3000 angstroms for red, 3850 angstroms for blue, and 4800 angstroms for green.

Actual measured results are shown as points on the graph of FIG. 7 with symbols indicating correspondence to the data of FIG. 5. The results of FIG. 7 indicate that a color gamut close to that of a CRT may be obtained with a structure as disclosed herein (e.g. the embodiment described in reference to FIG. 5). It is also contemplated that addition of at least one anti-reflective coating enhances the color gamut.

Figure 8A:
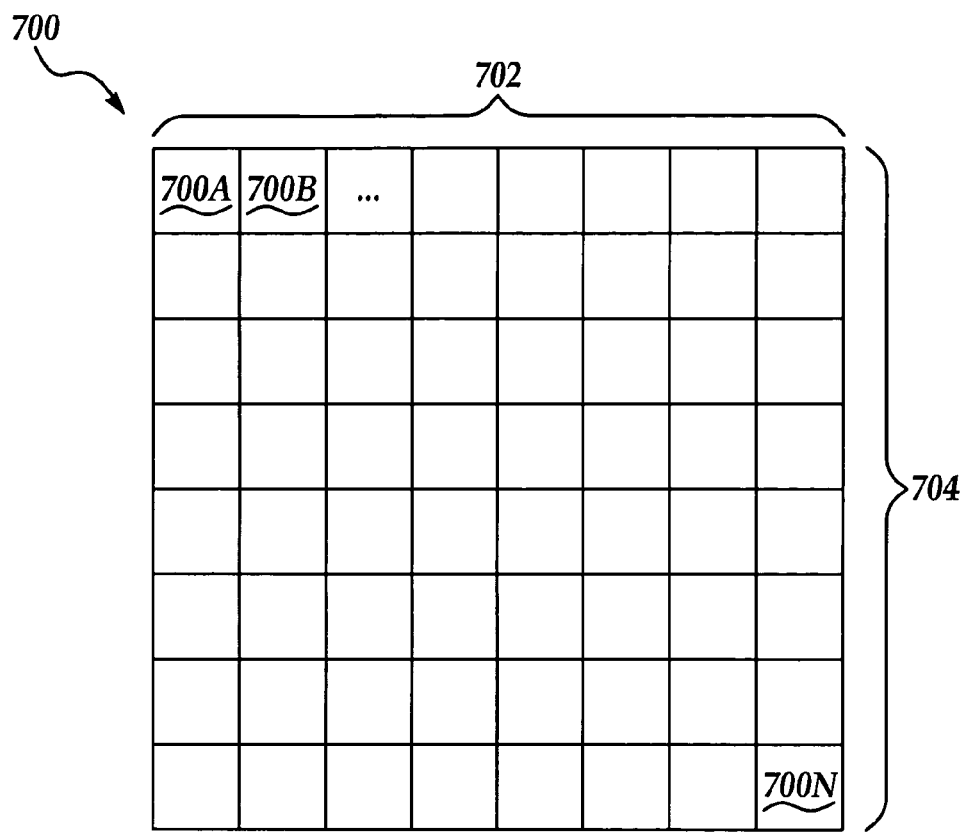
FIG. 8A is a diagram of an array of passive pixel mechanisms.

FIG. 8A shows an array 700 of passive pixel mechanisms, according to an embodiment. The array 700 of passive pixel mechanisms includes the mechanisms 700A, 700B, . . . 700N, organized into columns 702 and rows 704. Each of the pixel mechanisms 700A, 700B, . . . 700N is able to variably select a visible wavelength at a corresponding intensity by optical interference and absorption, in correspondence with a displayable image. The pixel mechanisms 700A, 700B, . . . 700N may be considered the apparatus for performing this functionality in an embodiment as disclosed herein. The mechanisms 700A, 700B, . . . 700N are passive in that they may not generate light by themselves, but rather reflect and/or transmit ambient and/or supplemental light.

In one embodiment, each of the passive pixel mechanisms 700A, 700B, . . . 700N includes one or more of the electronic device disclosed herein. Thus, a pixel may include one or more of the devices (e.g. spatial light modulators 100). Where the passive pixel mechanisms 700A, 700B, . . . 700N display their corresponding pixels of the displayable image in an analog manner, each of the mechanisms 700A, 700B, . . . 700N may include only one electronic device, because the single device is able to display substantially any color at any intensity. Where the mechanisms 700A, 700B, . . . 700N display their corresponding pixels in a digital manner, each of the mechanisms 700A, 700B, . . . 700N may include three of the electronic devices (and thus three optical resonant cavities 106), one for each of the red color component, the green color component, and the blue color component. It is to be understood that each of the optical resonant cavities 106 may further be divided into a plurality of cavity groups, each cavity group variably selecting a visible wavelength at an intensity corresponding to a color and an intensity of a corresponding pixel of the displayable image.

Figure 8B:
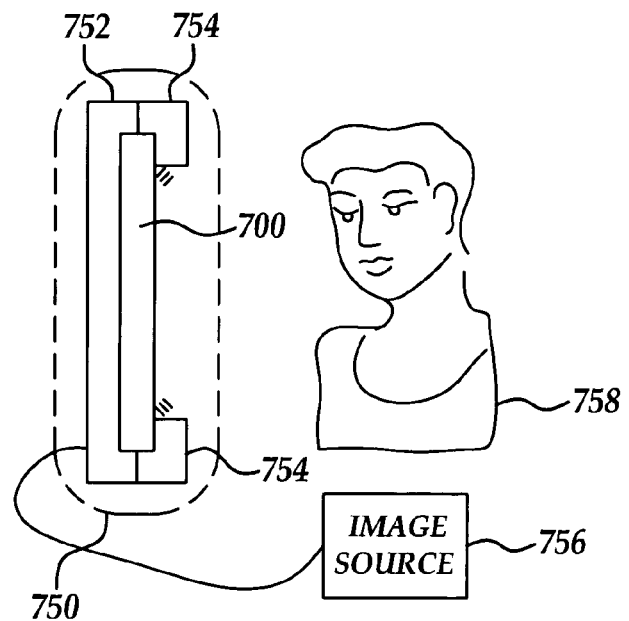
FIG. 8B is a schematic view of an embodiment of a display device.

FIG. 8B shows a schematic profile of a display device 750, according to an embodiment, which incorporates the array 700 of passive pixel mechanisms. An optional supplemental light source(s) 754 outputs light for reflection by the mechanisms 700A, 700B, . . . 700N. Where the light source(s) 754 is present, the mechanisms 700A, 700B, . . . 700N may reflect both the light provided by the source(s) 754, as well as any ambient light. Where the light source(s) 754 is absent, the mechanisms 700A, 700B, . . . 700N in the array 700 may reflect ambient light. The light source(s) 754 is indicated in the embodiment of FIG. 8B such that it outputs light for reflection by the mechanisms 700A, 700B, . . . 700N. In another embodiment, the light source(s) 754 may be behind the array 700B, such that the mechanisms 700A, 700B, . . . 700N transmit light output by the source(s) 754.

A controller 752 controls the pixel mechanisms 700A, 700B, . . . 700N, thereby substantially effectively providing a pixilated displayable image to the pixel mechanisms 700A, 700B, . . . 700N. That is, in the embodiment where the mechanisms 700A, 700B, . . . 700N each include one or more of the electronic device(s), the controller 752 may changes the thickness 108 of the cavity 106 of each device, such that the image is properly rendered by the pixel mechanisms 700A, 700B, . . . 700N, for display to a user 758. The controller 752 electrically and/or otherwise adjusts the thickness 108 of the optical cavity 106 where, once adjusted, the thickness 108 is maintained by the substrate 110.

The controller 752 may receive the displayable image from an image source 756 in a pixilated or non-pixilated manner. If non-pixilated, or if pixilated in a manner that does not correspond on a one-to-one basis to the array 700 of passive pixel mechanisms 700A, 700B, . . . 700N, the controller 752 itself divides the image into pixels corresponding to the array 700 of passive pixel mechanisms 700A, 700B, . . . 700N. The image source 756 may be external to the display device 750 (as depicted in the embodiment of FIG. 8B) or may be internal thereto. In an embodiment, the image source 756 may be, but is not limited to a desktop computer external to the display device 750, or a laptop or notebook computer, personal digital assistant (PDA) device, wireless phone, or other device of which the display device 750 is a part.

Figure 9:
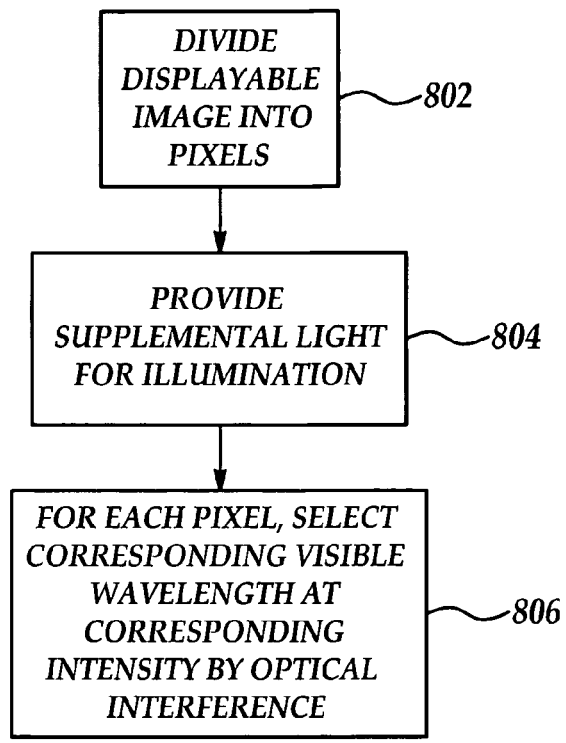
FIG. 9 is a flow diagram of an embodiment of the method.

FIG. 9 shows a method of using an embodiment of the display device 750 of FIG. 8B. First, a displayable image is divided into pixels (802), resulting in a pixilated displayable image. Light is optionally provided (804), to supplement any ambient light. For each pixel of the image, a corresponding visible wavelength is selected, at a corresponding intensity, by optical interference and absorption (806), as has been described. The corresponding wavelength at the corresponding intensity may be selected in a digital or an analog manner, as has also been described.

Figure 10:
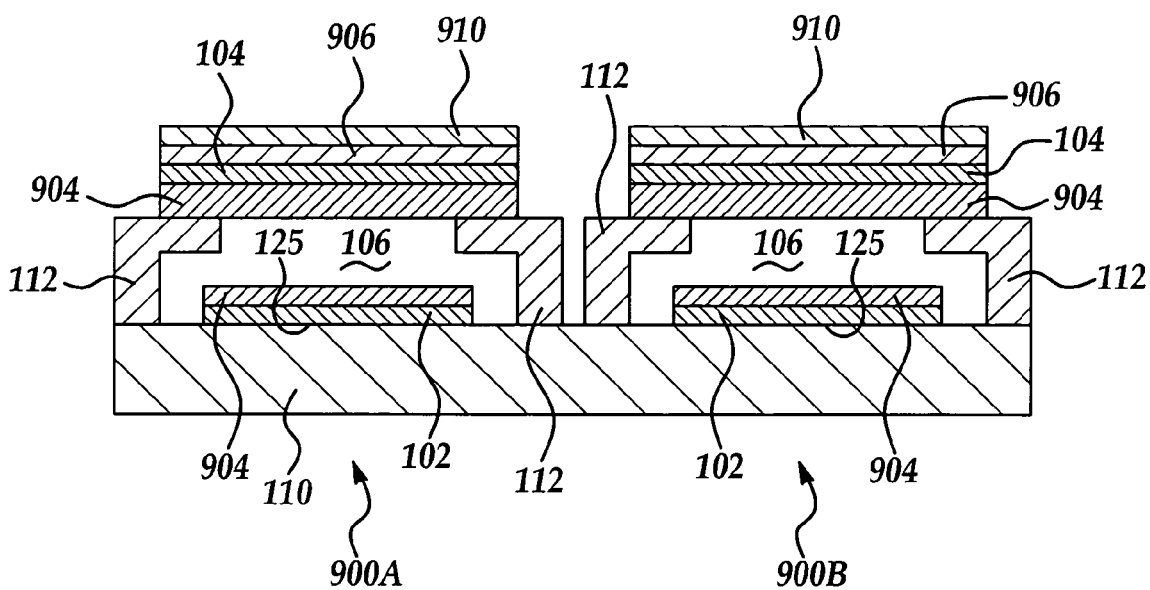
FIG. 10 is a cross-sectional view of an embodiment of the electronic device.

FIG. 10 shows a pair of electronic devices 900A, 900B for at least partially displaying a corresponding pair of pixels of a displayable image, according to an embodiment. Each of the electronic devices 900A, 900B is a specific embodiment of the electronic device (e.g. spatial light modulator 100) of FIG. 1A and FIG. 3, thus the description of these Figures applies equally to FIG. 10 as well. Furthermore, the electronic devices 900A, 900B may each be used to realize each of the passive pixel mechanisms 700A, 700B, . . . 700N of FIG. 8A, in one embodiment. The following description of FIG. 10 is made with specific reference to the electronic device 900A, but is identically applicable to the electronic device 900B. Furthermore, FIG. 10 is not drawn to scale, for illustrative clarity.

In an embodiment, a second face 125 of first reflector 102 may be positioned over a substrate 110 (e.g. a silicon substrate or semiconductor substrate), which, more generally, may be a conductive reflective layer. A thin dielectric 904 (an insulator layer 124) may be established over the first reflector 102 to prevent shorting of the reflectors 102, 104.

The optical cavity 106 may be defined between the second reflector 104 and the first reflector 102, where the top reflector 104 is also more generally a conductive reflective layer. A spring mechanism 112 may be positioned over the top reflector 104. The spring mechanism 112 is a flexure layer that acts as a flexible electrode for the top reflector 104, as well as maintains tension on the top reflector 104, and allows the reflector 104 to move. The spacing of the optical cavity 106 may be controlled by calibrating voltage to the stiffness of the spring mechanism 112 in an analog mode, or by providing stops of varying thickness for red, green, and blue pixels in a digital mode.

A dielectric pixel plate 906, which may be an oxide, partially covers the spring mechanism 112 and the second reflector 104. In one embodiment, the dielectric pixel plate 906 may have a width ranging between about 10 and about 100 microns, and may have a height ranging between about 1 μm and about 5 μm.

An anti-reflective coating (ARC) 140, 910 covers the pixel plate 906. The ARC 140, 910 may be desirable to avoid unwanted coherent interactions within the optical cavity 106.

Figure 11:
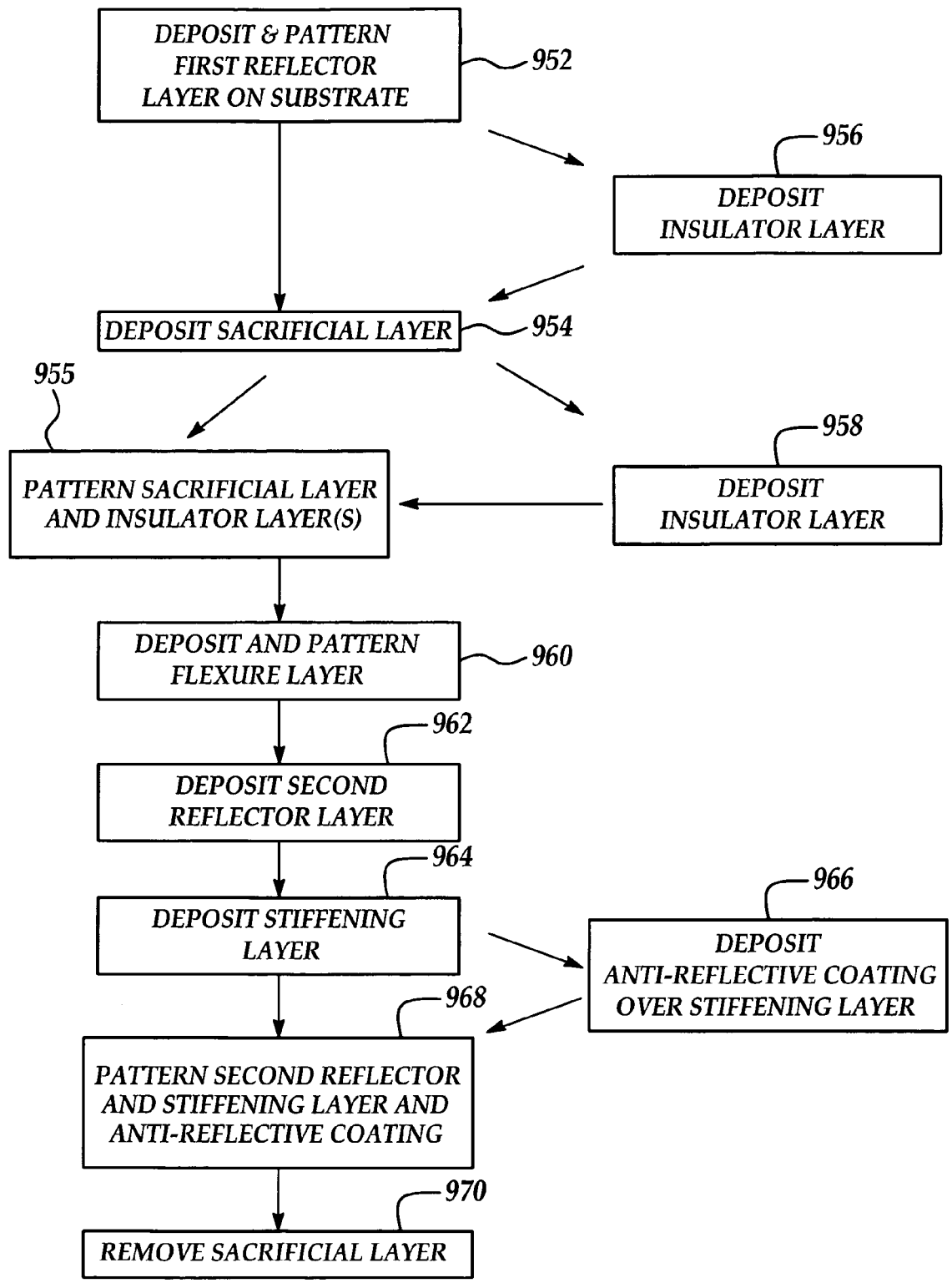
FIG. 11 is a flow diagram depicting an embodiment of the method of manufacturing an embodiment of the electronic device.

A method for manufacturing an electronic device 900A, 900B such as a spatial light modulator 100, is depicted in FIG. 11. In an embodiment of the method as disclosed, a first reflector layer 102 is established on at least a portion of the substrate 110, as at reference number 952. The first reflector 102 may be deposited and/or patterned.

The method further includes establishing (depositing and/or patterning) a sacrificial layer composed of a suitable filler material on the first reflector 102 as at 954. The sacrificial material may be any suitable material such as polysilicon or the like that may act as a placeholder for the cavities 106 to be formed. The sacrificial layer may be deposited and patterned by any suitable technique.

The method further includes establishing (depositing and/or patterning) a flexure layer 112 substantially between the sacrificial layer and a subsequently deposited second reflector layer 104, as shown at reference numeral 960. It is to be understood that the flexure layer 112 may be established on the sacrificial layer and any exposed portions of the substrate 110.

One or more insulator layer(s) 124 may also be established relative to first reflector layer 102. The insulator layer(s) 124 may be positioned before the establishment of the sacrificial layer (as at reference numeral 956) and/or after the establishment of the sacrificial layer (as at reference numeral 958). It is to be understood that establishing may include patterning and etching. In one embodiment, it is contemplated that the insulator layer(s) 124 and the sacrificial layer may be patterned and masked with one mask and etched sequentially (as shown at reference numeral 955), thereby advantageously resulting in process simplicity and self-alignment of the layers.

A second reflector layer 104, which may be a partial reflector layer, is then deposited on the flexure layer, as at reference numeral 962. The method may further include providing an oxide layer (or any suitable optically transparent layer that acts as a stiffening layer 160) in overlying relationship with second reflector layer 104 as described at reference numeral 964. This may include depositing and/or patterning the oxide.

Where desired or required, an embodiment of the method may further optionally include providing (e.g. depositing and/or patterning) one or more layers of anti-reflecting coating material(s) 140, 910 over the stiffening layer 160 as at reference numeral 966.

In an embodiment, as shown at reference numeral 968, the second reflector layer 104, the stiffening layer 160, and the anti-reflective coating layer(s) 140 (if present), 910 may be masked together. The layers 104, 160, and 140 may be masked with one mask and etched substantially sequentially, thereby providing process simplicity and layer self-alignment.

Once the layers 104, 124, 160, and/or 140 are formed, the sacrificial layer may be removed (as at reference numeral 970) to form an air gap, defined as optical cavity 106. Removal of the sacrificial layer may be through any suitable opening defined in the assembly (a non-limitative example of which is a via hole) or the like. Removal may be accomplished by any suitable process such as isotropic polysilicon etching or the like.

Figure 12:
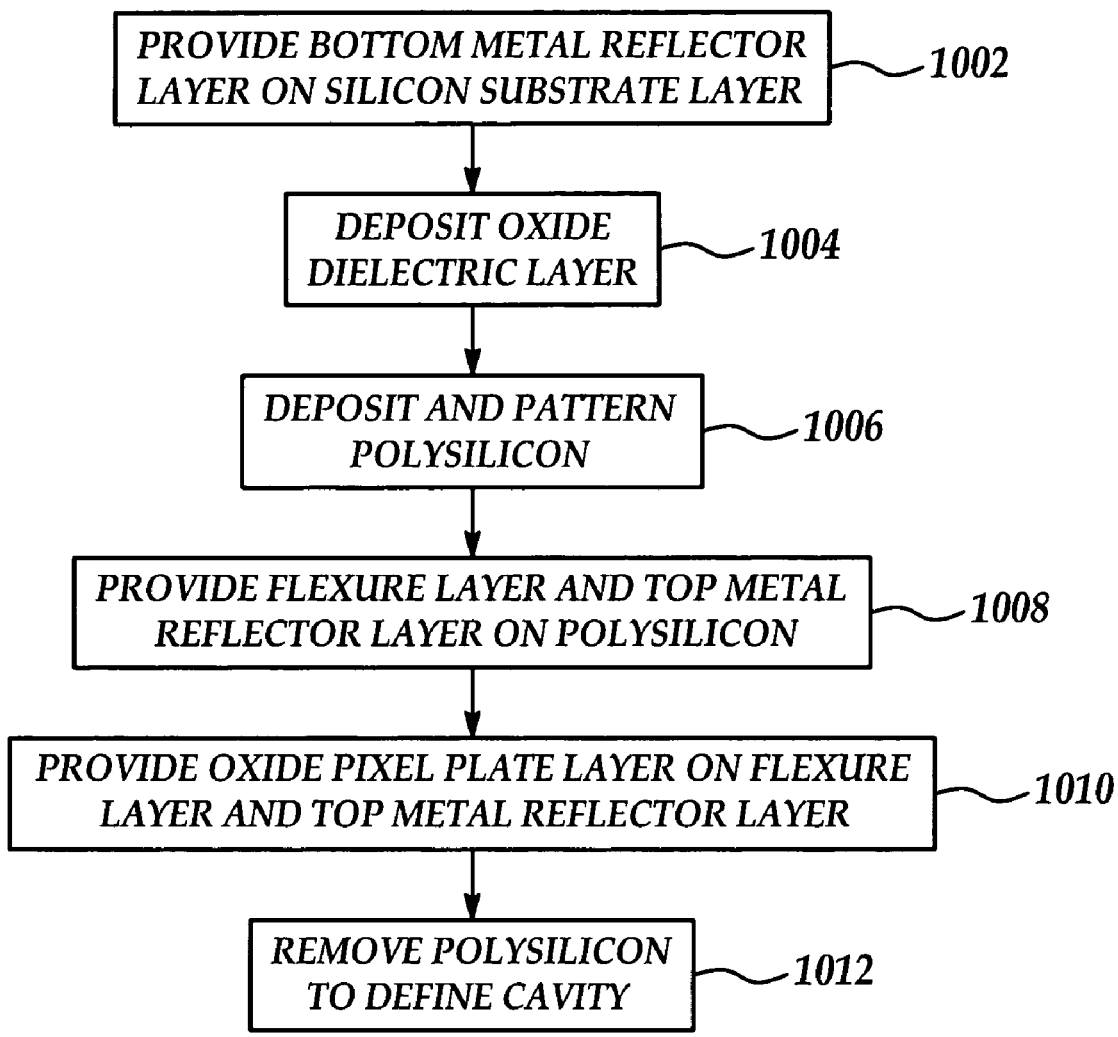
FIG. 12 is a flow diagram depicting an alternate embodiment of the method of manufacturing an embodiment of the electronic device.

FIG. 12 shows a detailed embodiment of the method for manufacturing an electronic device as disclosed herein, such as the electronic device 900A or 900B of FIG. 10, or a display device having a number of such electronic devices, according to embodiments as disclosed herein. First, a first metal reflector layer 102 is provided/established (e.g. deposited and/or patterned) on a silicon substrate 110, 902 (step 1002). Next, an oxide dielectric layer (e.g. an insulator layer 124) may be deposited (step 1004).

Polysilicon or another suitable filler/sacrificial material may then deposited and patterned (1006). The polysilicon acts as a placeholder for the resonant optical cavity 106 to be formed. A flexure layer is then provided on the polysilicon (1008). The flexure layer may also be patterned.

An oxide pixel plate layer (see the dielectric pixel plate in FIG. 10) may be provided (e.g. deposited and/or patterned) after the flexure layer is patterned, as depicted at reference numeral 1010. The polysilicon that has been previously deposited is then removed to define the resonant optical cavity 106 (step 1012). The removal may be accomplished by performing isotropic polysilicon cleanout etching.

Figure 13A:
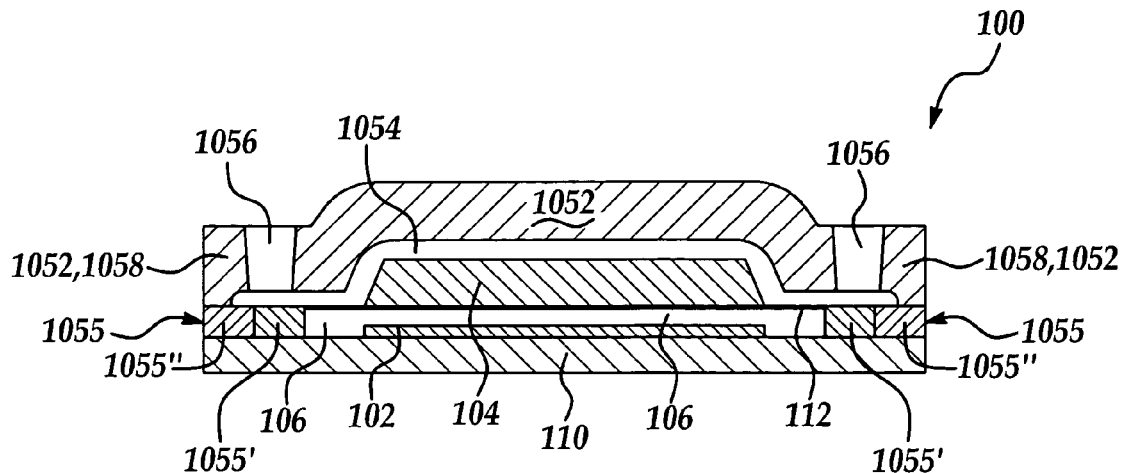
FIGS. 13A, 13B, and 13C are detailed cross-sectional views of alternate embodiments of the electronic device as shown in FIG. 1A.
Figure 13B:
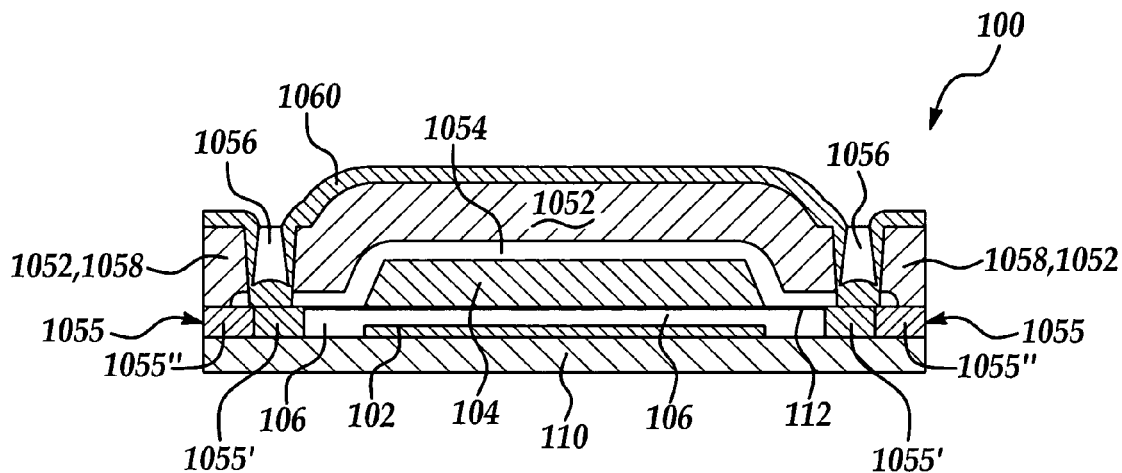

FIGS. 13A and 13B show an embodiment of the electronic device 100 similar to that of FIG. 1A. Specifically, FIGS. 13A and 13B are Fabry-Perot-based devices. The sawing and packaging of optical micro-electrical mechanical system (MEMS) devices, such as micro-mirrors, Fabry-Perot devices, and diffraction-based devices, may be difficult because of the fragility of the MEMS components and the desire for a transparent package, among other reasons. MEMS devices are generally semiconductor chips that have a top layer of mechanical devices, such as mirrors, fluid sensors, and the like. Wafer sawing is a wet process that may damage and/or contaminate the delicate devices upon release. Releasing the devices from sacrificial layers after sawing is difficult and costly if performed on a die-by-die basis. Packaging of such devices usually includes bonding a glass window to a package on a ceramic or other substrate, which may, in some instances, be costly, difficult to perform, and/or may add considerable size to the device. The electronic device 100 of the embodiment of FIGS. 13A and 13B substantially addresses these problems. Referring now to FIG. 13A, a sacrificial material may be deposited over the movable components of the device 100, including the substrate 110, the reflective layers 102, 104 that define the optical cavity 106, and the spring mechanism 112 that have been previously described. A layer/self-packaging layer 1052 may be deposited over and makes contact with the substrate 110, 902 at the locations indicated by the reference number 1058. Opening(s) 1056 may be patterned and etched in the layer 1052. The device 100 may then be formed by isotropically etching away the sacrificial material to form a cavity 1054, using selective release chemistries known within the art, which may be dry or wet processes.

Areas 1055 are illustrative of those areas of the device 100 that may not receive the sacrificial material. In an embodiment, areas 1055 may be posts. In another embodiment, portions 1055' of areas 1055 (without a lower portion of sacrificial material, e.g. the sacrificial material established to form cavity 106) are used to connect the flexure region (or spring mechanism 112) to the substrate 110. In this embodiment, the areas 1055 may be part of the spring mechanism 112 or part of the top reflector 104. In an alternate embodiment, other portions 1055" of areas 1055 (without a lower and an upper portion of sacrificial material, e.g. the sacrificial material established to form one or more of cavity 106 and cavity 1054) may be part of the layer 1052, thus connecting the layer 1052 to the substrate 110.

Referring next to FIG. 13B, a material 1060 may then optionally be deposited into the opening(s) 1056, to provide a sealed environment for the device 100. The layer 1052 and the material 1060 may be transparent dielectrics, or multi-layer films. The material 1060 may perform a dual role as both an anti-reflective coating and a sealing layer. Where techniques such as physical vapor deposition (PVD) or chemical vapor deposition (CVD) are utilized, a vacuum or hermetic environment may be achieved. High pressure CVD may also be employed where a higher-pressure environment is utilized. It is to be understood that if a hermetically sealed environment is not required and/or desired, the material 1060 may not be deposited. Without the material 1060, some protection for the device 100 is achieved as non-hermetic seals may assist in protecting the device 100 from water, contaminants, and/or articulates. If the material 1060 is used to seal the openings 1056, but is not desired over the entire device 100, the material 1060 may be patterned and etched away using known lithographic techniques.

Furthermore, the process described in reference to FIGS. 13A and 13B enables encapsulation within a clean-room environment without conventional packaging, such that the process may be described as self-packaging. Because the process may be performed in a clean-room environment, and the release operation occurs inside a protective cavity, increased yields may result. Once the cavities are sealed, the die may be sawed off, using techniques known within the art, without damaging the device 100.

Figure 13C:
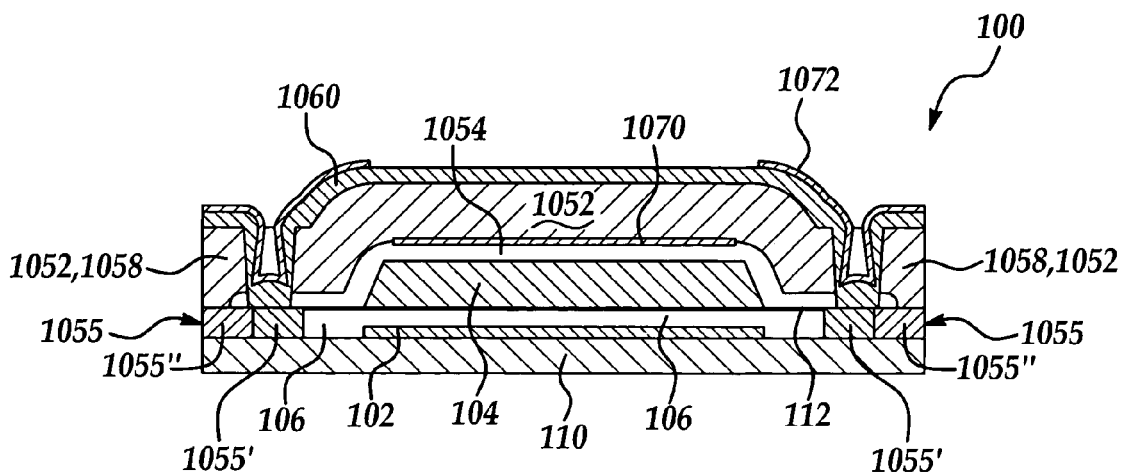

FIG. 13C shows an embodiment of the electronic device (e.g. spatial light modulator 100) similar to that shown in FIG. 1A. It is to be understood that the ratio of the active light modulator area to the non-active area is referred to as the aperture ratio. The non-active area includes the space between pixels, support posts, the flexure area, and so on. Light reflected from the non-active area may increase the black state reflectance, reducing overall system contrast. The electronic device 100 as depicted in FIG. 13C reduces this effect by including an absorbing layer, or border mask 1072 to cover such non-active areas. The material 1060 may provide a support area for the border mask 1072. Alternatively, if optional layer 1060 is not present, the border mask 1072 may be deposited and patterned on layer 1052 before the opening(s) 1056 are defined. In this embodiment, the openings 1056 may be formed in both layers 1072 and 1052.

The border mask 1072 may be composed of a variety of different materials, including, but not limited to absorptive polymers, photo-imageable absorptive polymers, metal and/or dielectric composites, and/or interference-based induced absorbers, and/or mixtures thereof. Absorptive polymers are typically spun on and imaged with a photoresist mask and develop process. Photo-imageable polymers may be patterned directly with lithographic techniques. Metal and/or dielectric composites known as cermets are other materials that may be used and have typically been developed for use as solar absorbers. Such materials include black molybdenum, black tungsten, and black chrome, those having very high absorbances, and/or mixtures thereof. Further, the border mask 1072 materials may be deposited with sputtering or evaporation techniques. Induced absorbers maximize the absorbance within a dissipating layer, by tuning layer thickness. Induced absorbers are relatively thin, such as less than about 1000 angstroms.

The embodiment of the electronic device 100 shown in FIG. 13C lends itself to a three-state operation having dedicated pixel types. For instance, there may be a type-one three-state pixel having the color states red, green, and black, or there may be a type-two three-state pixel having the color states red, blue, and black. There may also be a type-three three-state pixel having the color states green, blue, and black. Thus, the configuration of this operation includes groups of three-state pixels. Different pixels in the group are designed to operate with different states. The different color states are controlled by the thickness of the cavity 1054 formed by the removal of the sacrificial material. Such a configuration may be operated in a digital mode with one pixel plate, or reflector state in a non-contact position, and the other two states in contact with either the top or bottom capacitor plates, or reflectors 102, 104. This has the advantage over a single-gap, two-state, configuration by allowing a color to be produced by two of the three pixels, instead of one of the three pixels, which may lead to brighter colors.

The electronic device 100 of the embodiment of FIG. 13C also lends itself to a dual-gap, dual-capacitor pixel design, which is characterized by the movement of reflector 104, forming two variable capacitors, as is now described. A layer 1070 is a partial reflector layer that may optionally be established on the underside of the layer 1052, and over the reflector 104. The layer 1070 may act as both a partial reflector and as a capacitor plate. The reflector 104 may be driven up towards the layer 1070, or down towards reflector, or capacitor plate, 102 electrostatically. The spring mechanism 112 thus is deflected in two directions and needs to travel only about half as far from its equilibrium position to cover the same total travel as when deflected in just one direction. This increased travel range enables modes of operation where pixels can produce multiple colors, multiple saturations, and/or black. The cavity 1054 serves as one gap, and the optical cavity 106 serves as another gap in this design.

Such a design can function in at least two different modes of operation. For example, in one mode of operation, individual pixels may be capable of creating multiple colors and/or intensities as needed for color displays. The pixels operate in contact mode at one or both of the gap extremes, and otherwise operate in non-contact mode. In another mode of operation, multiple hues and intensities can also be achieved without operating in contact mode. Furthermore, the electronic device 100 of any of the embodiments depicted in FIGS. 13A, 13B, and 13C lends itself to single-gap, dual mode (or multilevel) operation, where the modes include contact between the reflectors 102, 104 and non-contact between the reflectors 102, 104. Each pixel may be capable of creating multiple colors and intensities as needed for color displays. Further, the pixels may operate in a contact mode at one gap extreme, and in a non-contact mode for the remaining states.

When pixels are dedicated to specific hues, such as red, green, and blue, optical efficiency may be reduced, since pixels of the wrong color cannot be used to generate the desired color. Therefore, it is advantageous to control the pixel gap, which is the thickness 108 of the optical cavity 106, in a noncontact mode, such as an analog mode, a multilevel digital mode, or a combination analog and digital mode. The device 100 may need the thickness 108 to be less than 1000 angstroms to create black, about 1800 angstroms to create blue, and about 2800 angstroms to create red. To provide such different thicknesses, a single-gap, voltage control mode of operation that may be utilized consists of operating in a noncontact mode between red and blue, and then allowing the pixel to snap to the black state in a digital mode.

Figure 14A:
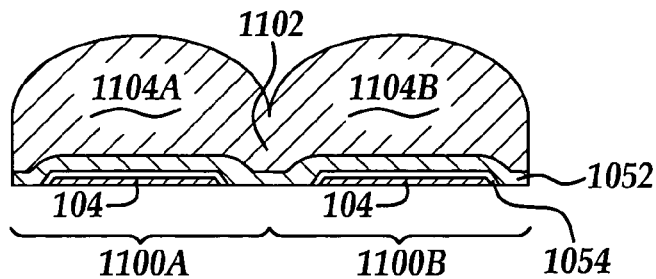
FIGS. 14A and 14B are schematic cross-sectional views of embodiments of electronic devices including lenses.
Figure 14B:
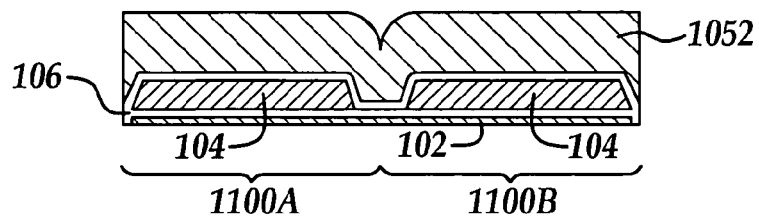

FIGS. 14A and 14B show a portion of a pair of electronic devices (e.g. monolithic MEMS devices) 1100A and 1100B for at least partially displaying a corresponding pair of pixels of a displayable image, according to varying embodiments disclosed herein. Each of the electronic devices 1100A and 1100B is a similar embodiment of the electronic device 100 of FIG. 1A.

It is noted that as pixel size is reduced, a smaller aperture ratio usually results. In FIG. 14A, however, any disadvantages that accompany a reduced aperture ratio are overcome by employing integral lenses 1104A and 1104B applied directly to the devices 1100A and 1100B, using coating or depositional techniques. The layer 1052 provides a substrate for these micro-lenses 1104A, 1104B, after an initial layer 1102 has been deposited. The lenses 1104A, 1104B may be formed by patterning photoresist or other photo-imageable polymers using known lithographic techniques and then partially flowing the patterns to the desired lens profile with heat treatment. The polymer may remain as the final lenses 1104A, 1104B or may be used as a mask to transfer the lens pattern to the underlying layer 1102 with plasma or reactive-ion etching. The lenses 1104A and 1104B may also be made more efficient by matching the shape thereof to the underlying pixels.

In FIG. 14B, the self-packaging layer 1052 may used as a simple form of a microlens. Such a technique relies on the coverage of the deposition over the reflector 104 to form a lensing action over the non-active region of the pixel where needed. For the layer 1052 to effectively act as a lens, deposition thickness, pixel gap spacing, and pixel plate or reflector thickness and/or profile are desirably optimized. The advantage to the approach FIG. 14B is that no additional lens is needed, and the lensing action is present only where it is needed, around the non-active region of the pixels.

It is to be understood that when two surfaces come into contact, they are frequently attracted to one another by a variety of different forces, such as Van der Waals attractive forces, chemical bonding forces, capillary forces, and Casimer forces. These forces often lead to surfaces that cannot be separated once they come into contact. Therefore, to prevent the reflectors 102, 104 of the electronic device 100 from coming into contact with one another, in one embodiment, antistiction bumps are placed on the first reflector 102 prior to fabrication of the second reflector 104.

Figure 15A:
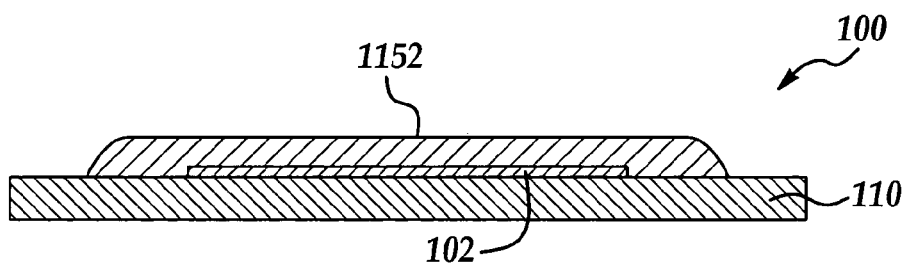
FIGS. 15A, 15B, and 15C are cross-sectional views illustratively depicting how anti-stiction bumps may be fabricated within an embodiment of the electronic device.
Figure 15B:
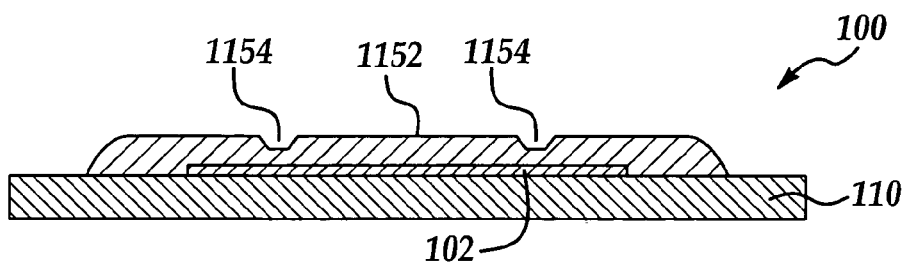
Figure 15C:
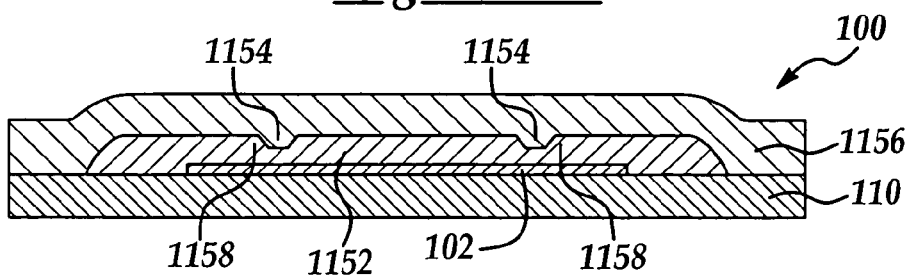

FIGS. 15A, 15B, and 15C illustratively depict the manner by which anti-stiction bumps may be fabricated on the first reflector 102. In FIG. 15A, the substrate 110 and the first reflector 102 have a layer 1152 deposited thereon. It is to be understood that in an embodiment, the layer 1152 is a sacrificial layer. Referring now to FIG. 15B, the layer 1152 may be patterned and partially etched to yield recesses 1154. Subsequent layers, such as the layer 1156 depicted in FIG. 15C, may then be subsequently deposited into the recessions 1154 to yield bumps 1158 within the recessions 1154.

Figure 16A:
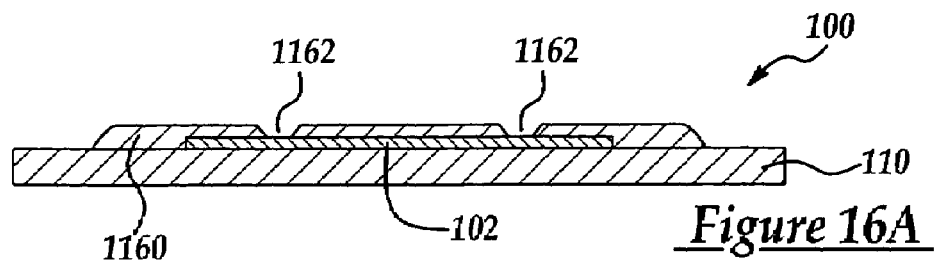
FIGS. 16A, 16B, and 16C are cross-sectional views illustratively depicting an alternate embodiment of how anti-stiction bumps may be fabricated within an embodiment of the electronic device.
Figure 16B:
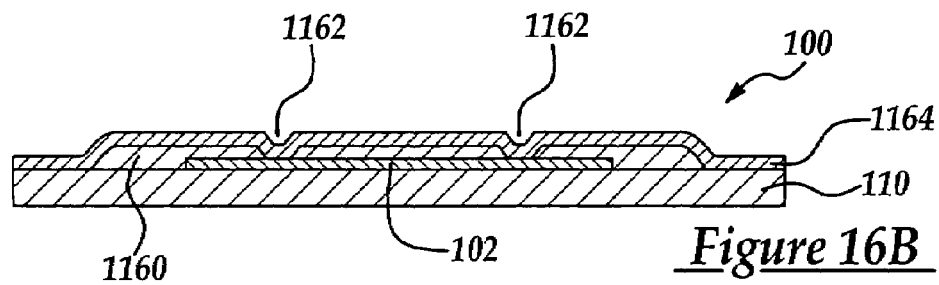
Figure 16C:
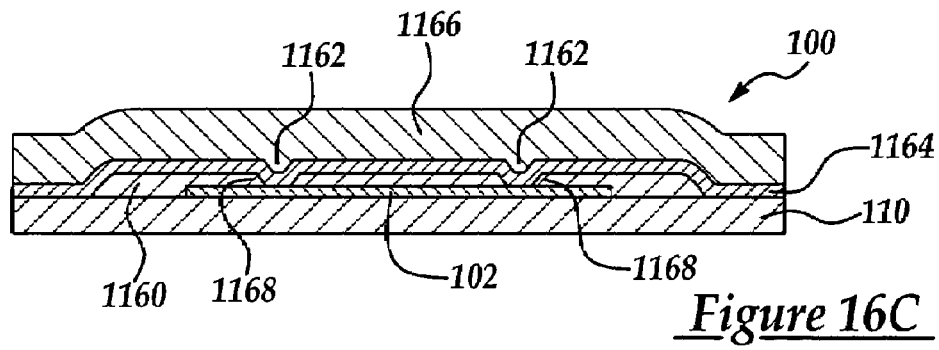

FIGS. 16A, 16B, and 16C illustratively depict the manner by which anti-stiction bumps may be fabricated on the first reflector 102, according to another embodiment as disclosed herein. The substrate 110 and the first reflector 102 of have a first sacrificial material 1160 deposited thereon. It is to be understood that the first sacrificial material 1160 may have substantially the same thickness as the desired anti-stiction bump height. The material 1160 may be patterned and etched to yield the recesses 1154, 1162. In FIG. 16B, a second sacrificial material 1164 may be deposited to achieve the total sacrificial layer thickness. Finally, in FIG. 16C, subsequent layers such as the layer 1156, 1166 may be deposited into the recessions 1154, 1162 to yield bumps 1158, 1168 within the recessions 1154, 1162. It is to be understood that the anti-stiction bump fabrication sequence(s) may be performed with any of the embodiment(s) of the process/method disclosed herein.

Figure 17:
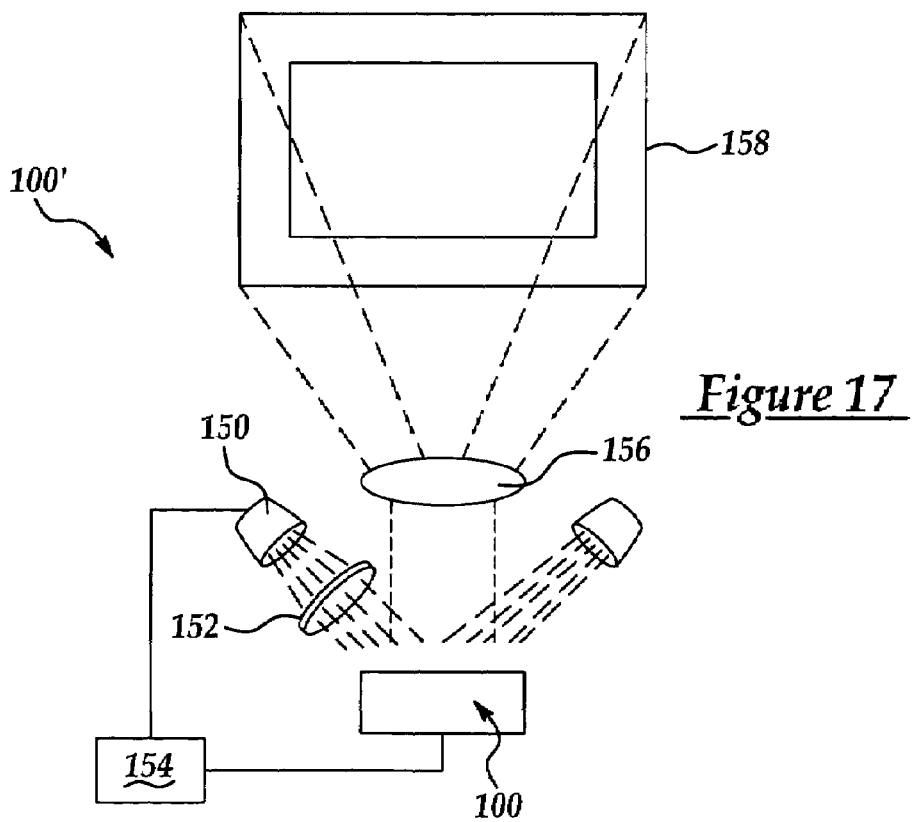
FIG. 17 is a schematic view of an embodiment of a display device.

The electronic devices as disclosed herein may be utilized in various systems including, but not limited to projectors and/or the display device 100' depicted in FIG. 17. It is contemplated that the display device 100', 750 may include at least one spatial light modulator 100 configured according to an embodiment. Light from light source 150 is focused on a light modulating device 100 by lens 152. Although shown as a single lens, 152 is typically a group of lenses, integrators, and/or mirrors that together focus and direct light from light source 150 onto the surface of the micromirror device array of light modulation device 100. Image data and control signals from controller 154 are written onto a suitable SRAM cell, DRAM cell, or the like, associated with each pixel mechanism or pixel mechanism array in the light modulation device 100. The data in these associated cells cause some of the pixels to configure to the "on" state. While multiple pixels are configured to be in the "on" state to reflect light to projection lens 156, a single pixel is shown for simplicity. Projection lens 156 focuses the light modulated by the light modulation device 100 onto a single image plane or screen 158. Pixels in the "off" state absorb light so that the light is substantially eliminated and not sent to the projection lens 156 (not shown).

It is to be understood that the electronic devices as described herein include, but are not limited to spatial light modulators, integrated circuits, and/or the like.

While several embodiments have been described in detail, it will be apparent to those skilled in the art that the disclosed embodiments may be modified. Therefore, the foregoing description is to be considered exemplary rather than limiting.

What is claimed is:

1. An optical electronic device with a partial reflector layer, the optical electronic device comprising:
    a first reflector having a single face disposed on a substrate;
    a second reflector disposed adjacent to the first reflector, thereby defining an optical cavity therebetween, the second reflector including at least one material having a refractive index and an extinction coefficient, each ranging from about 1 to about 5 across the visible spectrum; and
    a mechanism configured to permit variation of the optical cavity.

2. The optical electronic device as defined in claim 1 wherein the first and second reflectors each have a first face and an opposed second face, wherein the second face of the first reflector is the single face disposed on the substrate, wherein the second face of the second reflector is positioned towards the first face of the first reflector, and the optical electronic device further comprises at least one insulating layer disposed on at least one of the first face of the first reflector and the second face of the second reflector.

3. The optical electronic device as defined in claim 2 wherein the at least one insulating layer includes at least one of silicon dioxide, silicon nitride, silicon carbide, or mixtures thereof.

4. The optical electronic device as defined in claim 1 wherein the first reflector has a reflectivity of at least 90%.

5. The optical electronic device as defined in claim 4 wherein the first reflector includes at least one of aluminum, aluminum copper, aluminum alloys, silicon, silver, gold, platinum, tantalum, nickel, or mixtures thereof.

6. The optical electronic device as defined in claim 1 wherein the second reflector includes at least one layer of titanium, tantalum aluminum, titanium nitride, tungsten silicon nitride, alloys thereof, or mixtures thereof.

7. The optical electronic device as defined in claim 1, further comprising a layer of a material disposed on a first face of the second reflector, the layer of material adapted to provide sufficient rigidity to the second reflector such that the layer of material acts as a stiffening layer.

8. The optical electronic device as defined in claim 7, further comprising at least one anti-reflective layer disposed on the stiffening layer and opposed to the first face of the second reflector.

9. The optical electronic device as defined in claim 8 wherein the at least one anti-reflective layer includes magnesium difluoride.

10. The optical electronic device as defined in claim 1 wherein the mechanism allows a thickness of the optical cavity to be varied to select at least one of the visible wavelength and the intensity.

11. The optical electronic device as defined in claim 1 wherein the mechanism includes a flexure operatively connected to one of the first and second reflectors.

12. The optical electronic device as defined in claim 1 wherein a thickness of the second reflector is less then about 200 angstroms.

13. An optical electronic device with a partial reflector layer, the optical electronic device comprising:
    a first reflector and a second reflector defining an optical cavity therebetween, the second reflector including at least one material having a refractive index and an extinction coefficient, each ranging from about 1 to about 5 across the visible spectrum;
    a mechanism configured to permit variation of the optical cavity; and
    a layer of a material disposed on a first face of the second reflector, the layer of material adapted to provide sufficient rigidity to the second reflector such that the layer of material acts as a stiffening layer;
    wherein the stiffening layer has an extinction coefficient (k) ranging between about 0 and about 0.005 across the visible spectrum.

14. The optical electronic device as defined in claim 13 wherein the stiffening layer includes at least one of silicon dioxide, silicon nitride, silicon carbide, or mixtures thereof.

15. A method of making an optical electronic device with a partial reflector layer, the method comprising the steps of:
    establishing a single face of a first reflector on a substrate;
    positioning a second reflector adjacent to and in spaced relationship to the first reflector, Thereby defining an optical cavity therebetween, the second reflector comprising at least one material having at least one of a refractive index and an extinction coefficient, each ranging from about 1 to about 5 across the visible spectrum; and
    establishing a flexure layer between the first and second reflectors such that the flexure layer is operatively connected to one of the first reflector and the second reflector.

16. The method as defined in claim 15, further comprising establishing a circuit capable of introducing a charge sufficient to vary at least one optical property of the optical cavity by controlling a predetermined amount of charge stored on the first and second reflectors, such that at least one of visible wavelength and intensity are variably selectable to correspond with a pixel of a displayable image.

17. The method as defined in claim 15 wherein the first and second reflectors each have a first face and opposed second face, wherein the second face of the first reflector is the single face established on the substrate, wherein the second face of the second reflector is positioned towards the first face of the first reflector, and the method further comprises establishing at least one insulating layer on at least one of the first face of the first reflector and the second face of the second reflector, wherein the at feast one insulating layer is configured to prevent electrical shorting between the first and second reflectors.

18. The method as defined in claim 15, further comprising establishing a layer of a material on a first face of the second reflector, the layer of material adapted to provide sufficient rigidity to the second reflector such that the layer of material acts as a stiffening layer.

19. The method as defined in claim 18, further comprising establishing at least one anti-reflective layer on the stiffening layer and opposed the first face of the second reflector.

20. The method as defined in claim 15 wherein the second reflector includes at least one layer of titanium, tantalum aluminum, titanium nitride, tungsten silicon nitride, alloys thereof or mixtures thereof.

21. An integrated circuit for at least partially displaying a pixel of a displayable image, comprising:
  a semiconductor substrate;
  a first reflector having a single face disposed on the semiconductor substrate;
  a second reflector positioned adjacent to and a spaced distance from the first reflector, the first and second reflectors defining an optical cavity therebetween, wherein the first and second reflectors are tunable to be selective of a visible wavelength at an intensity by optical interference, the second reflector including at least one material having a refractive index and an extinction coefficient, each ranging from about 1 to about 5 across the visible spectrum; and
  a charge controlling mechanism adapted to permit variation of the optical cavity.

22. The integrated circuit as defined in claim 21 wherein the second reflector includes at least one layer of tantalum aluminum, titanium nitride, tungsten silicon nitride, or mixtures thereof.

23. The integrated circuit as defined in claim 21 wherein each of the first and second reflectors have a first face and opposed second face, wherein the second face of the first reflector is the single face disposed on the semiconductor substrate, wherein the first face of the first reflector positioned towards the second face of the second reflector, and the integrated circuit further comprising at least one insulating layer disposed on at least one of the first face of the first reflector and the second face of the second reflector.

24. The integrated circuit as defined in claim 23 wherein the at least one insulating layer includes silicon dioxide, silicon nitride, silicon carbide, or mixtures thereof, and wherein the at least one insulating layer is configured to prevent electrical shorting between the first and second reflectors.

25. The integrated circuit as defined in claim 21 wherein a thickness of the second reflector is less than about 200 angstroms.

26. An integrated circuit for at least partially displaying a pixel of a displayable image, comprising:
  a semiconductor substrate;
  a first reflector disposed on the semiconductor substrate;
  a second reflector positioned a spaced distance from the first reflector, the first and second reflectors defining an optical cavity therebetween, wherein the first and second reflectors are tunable to be selective of a visible wavelength at an intensity by optical interference, the second reflector including at least one material having a refractive index and an extinction coefficient, each ranging from about 1 to about 5 across the visible spectrum;
  a charge controlling mechanism adapted to permit variation of the optical cavity; and
  a layer of a material disposed on a first face of the second reflector, the layer of material providing sufficient rigidity to the second reflector such that the layer acts as a stiffening layer, wherein the stiffening layer has an extinction coefficient (k) ranging between about 0 and about 0.005 across the visible spectrum.

27. The integrated circuit as defined in claim 26, further comprising at least one anti-reflective layer disposed on the stiffening layer and opposed the first face of the second reflector.

28. The integrated circuit as defined in claim 27 wherein the at least one anti-reflective layer includes magnesium difluoride.

29. The integrated circuit as defined in claim 26 wherein the stiffening layer includes at least one of silicon dioxide, silicon nitride, silicon carbide, or mixtures thereof.

30. A display device having a light path, the display device comprising:
  a light modulation device on the light path for selectively reflecting a portion of the beam of light along a second light path in response to image data signals; and
  a controller for providing image data signals to the light modulation device;
  wherein the light modulation device comprises:
    a first reflector having a single face disposed on a substrate;
    a second reflector disposed adjacent to the first reflector, thereby defining an optical cavity therebetween, wherein the first and second reflectors are tuned to be selective of a visible wavelength at an intensity by optical interference, the second reflector comprising at least one material having a refractive index and an extinction coefficient, each ranging from about 1 to about 5 across the visible spectrum; and
    a charge controlling mechanism configured to permit variation of the optical cavity.

31. The display device as defined in claim 30 wherein the second reflector includes at least one layer of titanium, tantalum aluminum, titanium nitride, tungsten silicon nitride, alloys thereof, or mixtures thereof.

32. The display device as defined in claim 30, further comprising a layer of a material disposed on a first face of the second reflector, the layer of material adapted to provide sufficient rigidity to the second reflector such that the layer of material acts as a stiffening layer.

33. The display device as defined in claim 32, further comprising at least one anti-reflective layer disposed on the stiffening layer and opposed the first face of the second reflector.

34. The display device as defined in claim 30 wherein a thickness of the second reflector is less than about 200 angstroms.

35. A projector comprising the display device of claim 30.

36. An optical electronic device, comprising:
  a substrate;
  means for substantially fully reflecting light having a single face established on the substrate; and means for partially reflecting fight established adjacent to and spaced from the means for substantially fully reflecting light, the partially reflecting light means including at least one material having a refractive index and an extinction coefficient, each ranging from about 1 to about 5 across the visible spectrum.

37. The optical electronic device as defined in claim 36, further comprising stiffening means for supporting the partially reflecting means.

38. The optical electronic device as defined in claim 36, further comprising means for minimizing reflection of the device.

39. The optical electronic device as defined in claim 36, further comprising means for insulating the device.

\* \* \* \* \*

UNITED STATES PATENT AND TRADEMARK OFFICE
CERTIFICATE OF CORRECTION

PATENT NO. : 7,218,438 B2 Page 1 of 1
APPLICATION NO. : 11/238704
DATED : May 15, 2007
INVENTOR(S) : Przybyla et al.

It is certified that error appears in the above-identified patent and that said Letters Patent is hereby corrected as shown below:

In the Claims

Col. 22 (line 46), delete "Thereby" and insert therefor --thereby--.

Signed and Sealed this

Thirteenth Day of November, 2007

JON W. DUDAS
*Director of the United States Patent and Trademark Office*